US010926526B2

(12) United States Patent
Okamoto et al.

(10) Patent No.: US 10,926,526 B2
(45) Date of Patent: Feb. 23, 2021

(54) METHOD OF MANUFACTURING THREE-DIMENSIONALLY FORMED OBJECT

(71) Applicant: SEIKO EPSON CORPORATION, Tokyo (JP)

(72) Inventors: Eiji Okamoto, Matsumoto (JP); Masaya Ishida, Hara-mura (JP); Daiki Tokushima, Azumino (JP); Toshimitsu Hirai, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 281 days.

(21) Appl. No.: 15/345,703

(22) Filed: Nov. 8, 2016

(65) Prior Publication Data
US 2017/0136693 A1 May 18, 2017

(30) Foreign Application Priority Data

Nov. 12, 2015 (JP) .............................. JP2015-222156

(51) Int. Cl.
*B33Y 10/00* (2015.01)
*B29C 64/124* (2017.01)
(Continued)

(52) U.S. Cl.
CPC .............. *B33Y 10/00* (2014.12); *B22F 3/008* (2013.01); *B29C 64/112* (2017.08);
(Continued)

(58) Field of Classification Search
CPC ..... B29C 64/40; B29C 64/165; B29C 64/112; B29C 64/10; B29C 64/20; B29C 64/30;
(Continued)

(56) References Cited

U.S. PATENT DOCUMENTS 5,740,051 A * 4/1998 Sanders, Jr. .......... B29C 64/106
  700/119
6,169,605 B1 * 1/2001 Penn ...................... B33Y 50/00
  358/1.1
(Continued)

FOREIGN PATENT DOCUMENTS

JP      11-042714     2/1999
JP      2005-138422   6/2005
(Continued)

OTHER PUBLICATIONS

European Search Report for Application No. 16197594.1 dated Jun. 26, 2017.

*Primary Examiner* — Jacob T Minskey
*Assistant Examiner* — S. Behrooz Ghorishi
(74) *Attorney, Agent, or Firm* — Workman Nydegger

(57) ABSTRACT

A method of manufacturing a three-dimensionally formed object in which the three-dimensionally formed object is manufactured by laminating layers to forma laminate, includes: forming a constituent layer corresponding to a constituent region of the three-dimensionally formed object; forming a support layer which is in contact with the constituent layer and supports the constituent layer by ejecting a flowable composition including a resin from an ejecting portion in the form of liquid drops; solidifying the support layer; and heating the laminate which is formed in the formation of the constituent layer, the formation of the support layer, and the solidification of the support layer.

9 Claims, 15 Drawing Sheets

(51) Int. Cl.
  *B22F 3/00* (2006.01)
  *B33Y 40/00* (2020.01)
  *B29C 64/112* (2017.01)
  *B29C 64/40* (2017.01)
  *B29C 64/165* (2017.01)

(52) U.S. Cl.
  CPC .......... *B29C 64/124* (2017.08); *B29C 64/40* (2017.08); *B33Y 40/00* (2014.12); *B29C 64/165* (2017.08)

(58) Field of Classification Search
  CPC ......... B33Y 10/00; B33Y 30/00; B33Y 50/00; B33Y 70/00; B33Y 90/00
  See application file for complete search history.

(56) References Cited

U.S. PATENT DOCUMENTS

| | | |
|---|---|---|
| 2002/0167101 A1 | 11/2002 | Tochimoto et al. |
| 2006/0158456 A1 | 7/2006 | Zinniel et al. |
| 2011/0285052 A1* | 11/2011 | Wigand ............. B29C 67/0059 264/219 |
| 2013/0234370 A1 | 9/2013 | Suzuki et al. |
| 2015/0021815 A1* | 1/2015 | Albrecht ................ B05B 5/001 264/235 |
| 2015/0093544 A1* | 4/2015 | Van De Vrie ....... B29C 67/0059 428/156 |
| 2015/0104346 A1 | 4/2015 | Nakamura et al. |
| 2015/0210009 A1* | 7/2015 | Johnson ................ B05B 17/04 264/308 |
| 2015/0224575 A1 | 8/2015 | Hirata |
| 2017/0106589 A1 | 4/2017 | Ishisa et al. |

FOREIGN PATENT DOCUMENTS

| | | |
|---|---|---|
| JP | 2008-184622 | 8/2008 |
| JP | 2013-067121 | 4/2013 |
| JP | 2015-096646 | 5/2015 |
| JP | 2015-147984 | 8/2015 |
| JP | 2017-075361 A | 4/2017 |
| WO | 2015-056232 | 4/2015 |
| WO | 2015/105047 A1 | 7/2015 |

\* cited by examiner

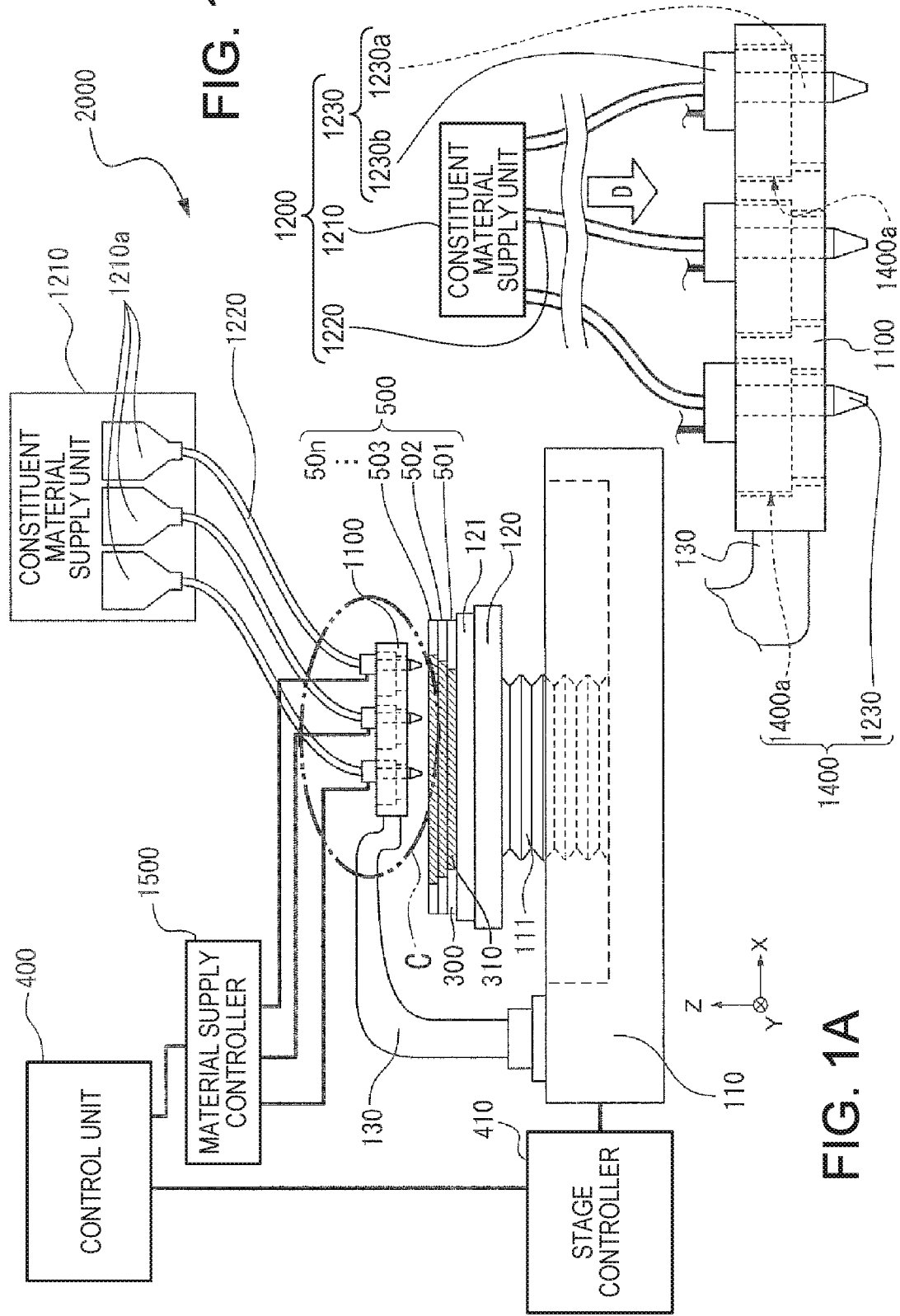

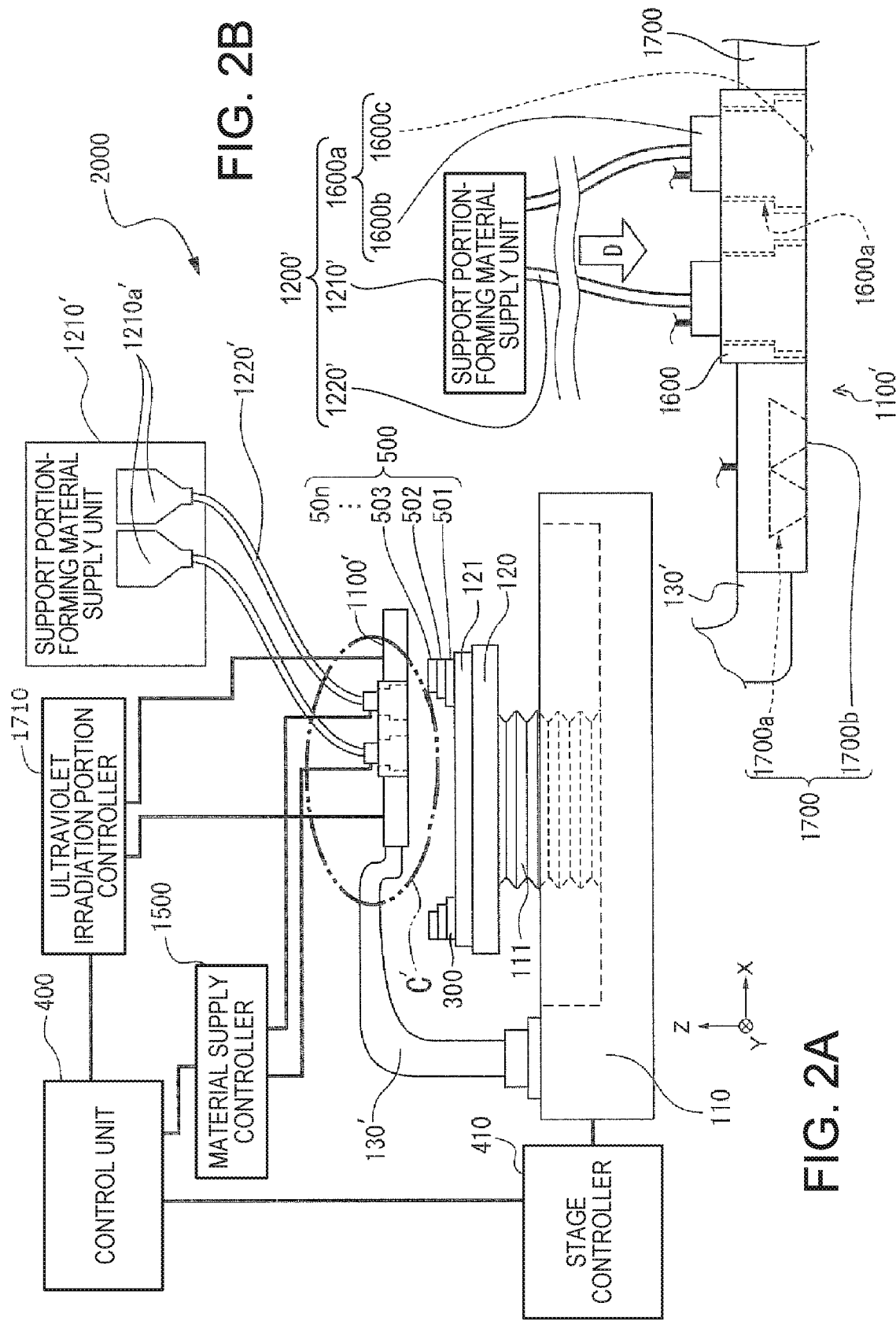

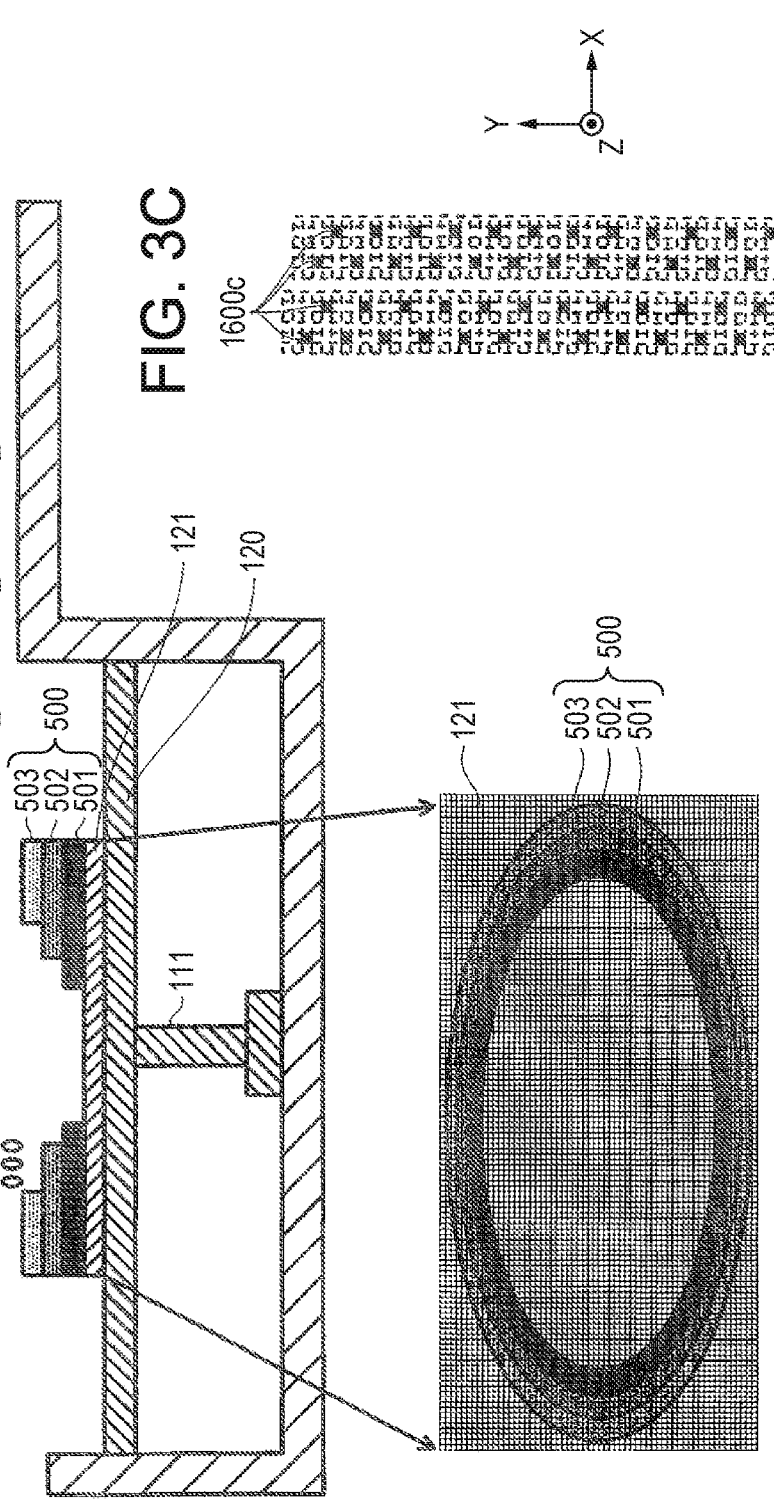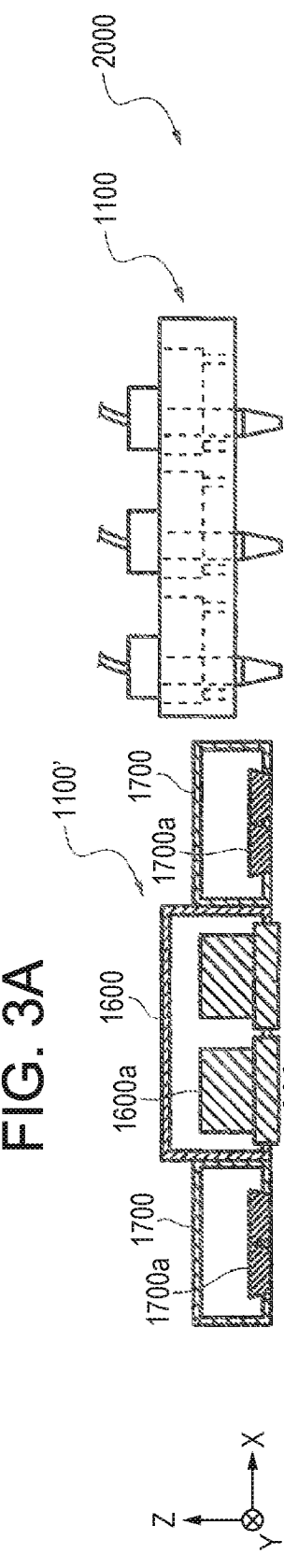

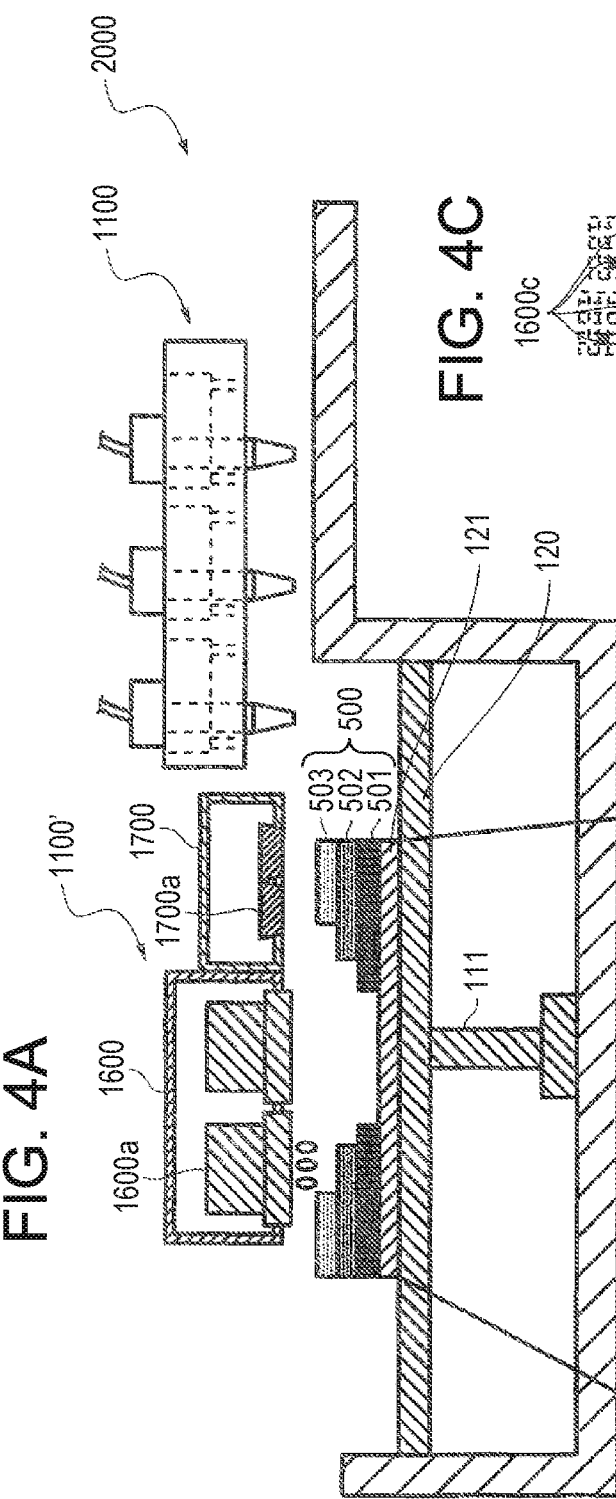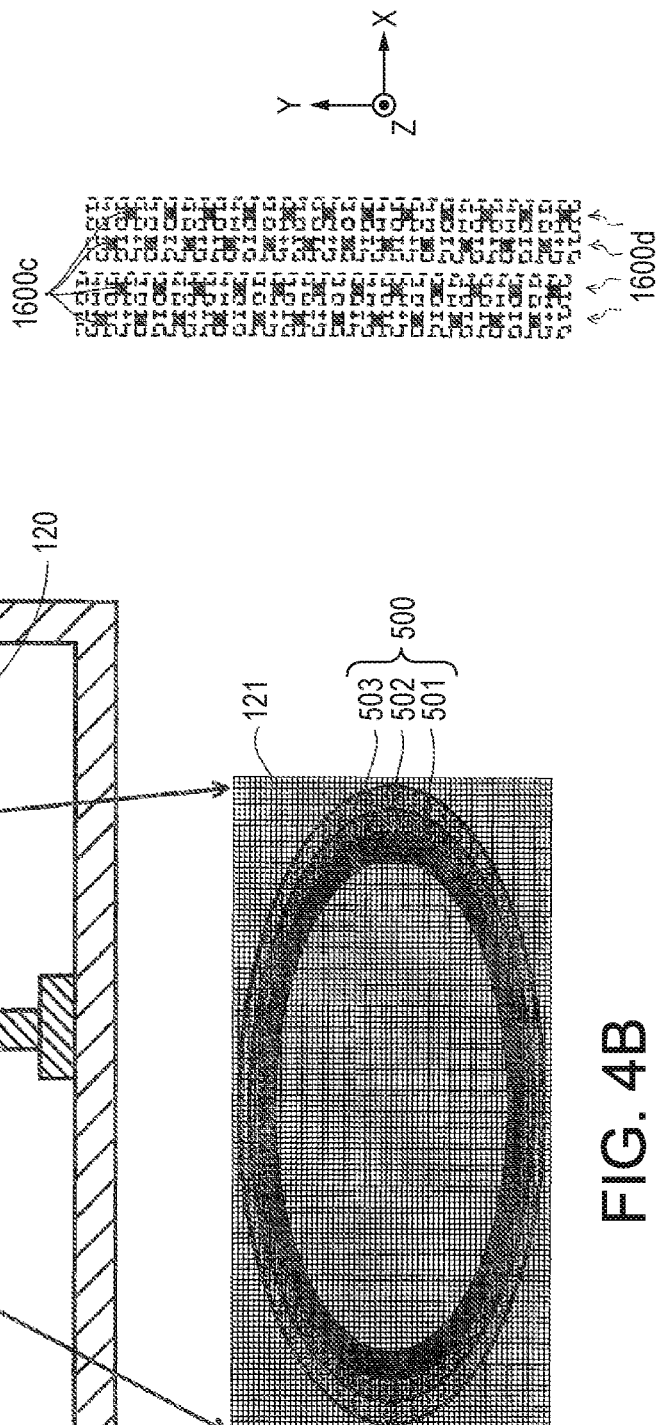

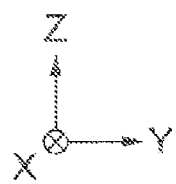

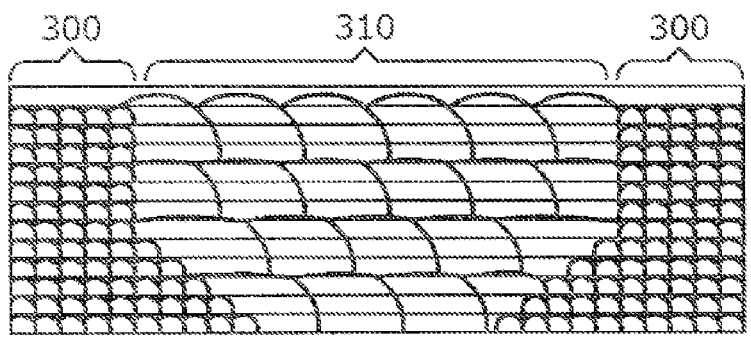
FIG.12A
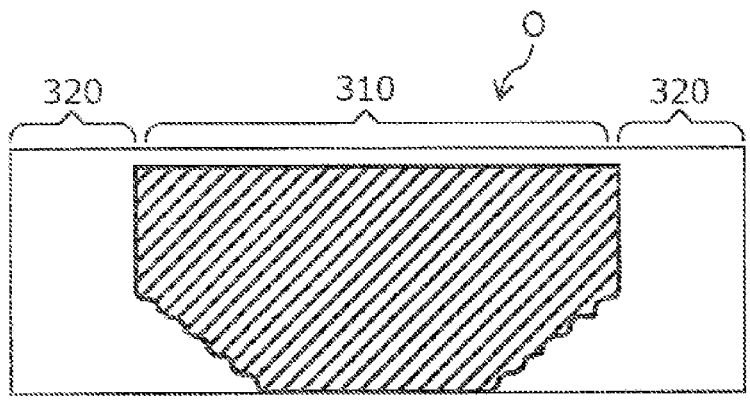
FIG.12B
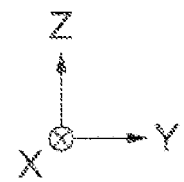

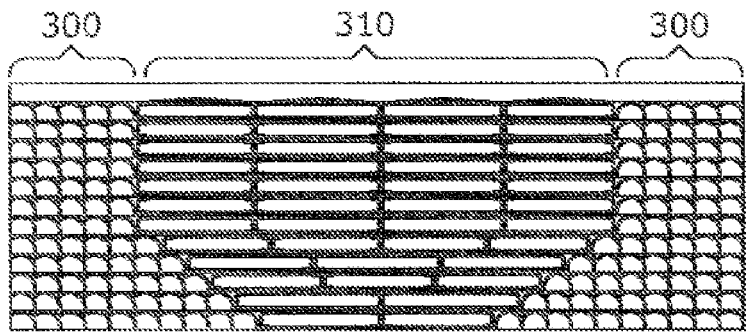
FIG.14A
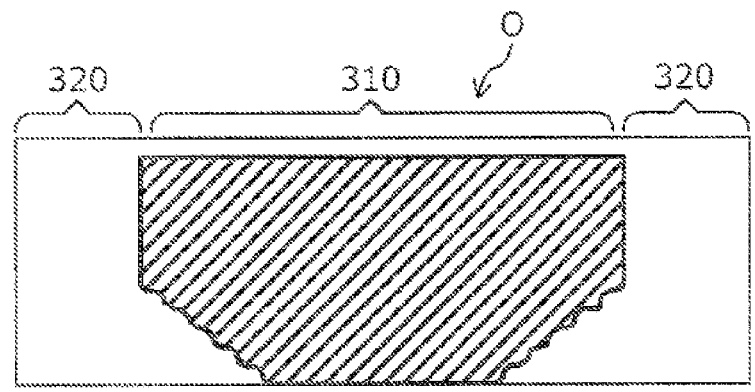
FIG.14B
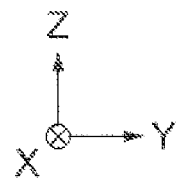

METHOD OF MANUFACTURING THREE-DIMENSIONALLY FORMED OBJECT

BACKGROUND

1. Technical Field

The present invention relates to a method of manufacturing a three-dimensionally formed object.

2. Related Art

In the related art, various methods of laminating layers to manufacture a three-dimensionally formed object have been disclosed. Among these, a method of forming a layer using a flowable composition to manufacture a three-dimensionally formed object is disclosed.

For example, JP-A-2008-184622 discloses a method of manufacturing a three-dimensionally formed object, the method including: forming a layer using a metal paste; and manufacturing a three-dimensionally formed object while irradiating a region of the layer corresponding to the three-dimensionally formed object with laser light to sinter or melt the region.

However, in the method of manufacturing a three-dimensionally formed object of the related art, a layer having a given thickness is formed to manufacture a three-dimensionally formed object. Therefore, in order to increase a manufacturing speed, it is necessary to increase the thickness of a layer such that the supply speed (supply rate per unit time) of a flowable composition, such as a metal paste, including particles is increased. Therefore, the manufacturing accuracy deteriorates. On the other hand, in order to improve the manufacturing accuracy, it is necessary to reduce the thickness of a layer such that a flowable composition, such as a metal paste, including particles is supplied with high accuracy. Therefore, the manufacturing speed is reduced. In this way, in the method of manufacturing a three-dimensionally formed object of the related art, there is a trade-off relationship between the manufacturing speed and the manufacturing accuracy.

SUMMARY

An advantage of some aspects of the invention is to rapidly manufacture a three-dimensionally formed object with high accuracy.

A method of manufacturing a three-dimensionally formed object according to a first aspect of the invention is a method of manufacturing a three-dimensionally formed object in which the three-dimensionally formed object is manufactured by laminating layers to forma laminate, the method including: forming a constituent layer corresponding to a constituent region of the three-dimensionally formed object; forming a support layer which is in contact with the constituent layer and supports the constituent layer by ejecting a flowable composition including a resin from an ejecting portion in the form of liquid drops; solidifying the support layer; and heating the laminate which is formed in the formation of the constituent layer, the formation of the support layer, and the solidification of the support layer.

According to the aspect, the method includes: forming a constituent layer; and forming a support layer by ejecting a flowable composition including a resin from an ejecting portion in the form of liquid drops. For example, by using the flowable composition in which the resin is dissolved or is dispersed in the form of fine particles, the support layer which determines the contour shape of the three-dimensionally formed object can be formed with high accuracy (the presence of the solid component (particles) having a large particle size can prevent the unevenness of the surface shape). By rapidly forming the constituent layer constituting the inside of the three-dimensionally formed object which is not necessarily to be formed with high accuracy, the three-dimensionally formed object can be rapidly manufactured with high accuracy.

Here, "contour" is a portion which forms the surface shape of the three-dimensionally formed object. For example, in a case where a coating layer is provided on the surface of the three-dimensionally formed object, "contour" may refer to a layer below the coating layer.

The method of manufacturing a three-dimensionally formed object according to a second aspect of the invention is directed to the method of manufacturing a three-dimensionally formed object according to the first aspect, in which, in the heating of the laminate, the support layer is decomposed and removed and the constituent layer is sintered.

According to the aspect, in the heating of the laminate, the support layer is decomposed and removed and the constituent layer is sintered. That is, in the heating of the laminate, the laminate is collectively sintered. Therefore, the support layer can prevent the shape of constituent layer from collapsing until it is decomposed and removed in the heating of the laminate after the formation of the laminate, and can form the three-dimensionally formed object with particularly high accuracy.

The method of manufacturing a three-dimensionally formed object according to a third aspect of the invention is directed to the method of manufacturing a three-dimensionally formed object according to the first or second aspect, in which, in the formation of the constituent layer, the flowable composition is ejected from the ejecting portion in the form of liquid drops to form the constituent layer, and a size of at least a portion of liquid drops for forming the support layer in the formation of the support layer is smaller than a size of at least a portion of liquid drops for forming the constituent layer in the formation of the constituent layer.

According to the aspect, the support layer can be formed using the liquid drops having a smaller size than the liquid drops for forming the constituent layer. That is, the support layer which determines the contour shape of the three-dimensionally formed object is formed using the relatively small liquid drops, and the constituent layer constituting the inside of the three-dimensionally formed object is formed using the relatively large liquid drops. Therefore, the support layer determining the contour shape of the three-dimensionally formed object, which is necessarily formed with high accuracy, can be formed with high accuracy, and the constituent layer constituting the inside of the three-dimensionally formed object, which is not necessarily formed with high accuracy, can be rapidly formed. Accordingly, the three-dimensionally formed object can be rapidly manufactured with high accuracy.

The method of manufacturing a three-dimensionally formed object according to a fourth aspect of the invention is directed to the method of manufacturing a three-dimensionally formed object according to any one of the first to third aspects, in which the resin is a ultraviolet curable resin, and in the solidification of the support layer, the support layer is irradiated with ultraviolet rays.

According to the aspect, the resin is an ultraviolet curable resin, and the support layer is irradiated with ultraviolet rays in the solidification of the support layer. Therefore, the support layer can be simply formed with high accuracy.

The method of manufacturing a three-dimensionally formed object according to a fifth aspect of the invention is directed to the method of manufacturing a three-dimensionally formed object according to any one of the first to third aspects, in which the resin is a thermosetting resin, and in the solidification of the support layer, the support layer is heated.

According to the aspect, the resin is a thermosetting resin, and the support layer is heated in the solidification of the support layer. Therefore, the support layer can be simply formed with high accuracy.

The method of manufacturing a three-dimensionally formed object according to a sixth aspect of the invention is directed to the method of manufacturing a three-dimensionally formed object according to any one of the first to third aspects, in which, in the formation of the support layer, the resin, which is solid, is melted and the molten resin is ejected from the ejecting portion in the form of liquid drops to form the support layer, and in the solidification of the support layer, the molten resin is cooled and solidified.

According to the aspect, in the formation of the support layer, the resin, which is solid, is melted and the molten resin is ejected from the ejecting portion in the form of liquid drops to form the support layer, and in the solidification of the support layer, the molten resin is cooled and solidified. Therefore, the support layer can be simply formed with high accuracy.

The meaning of "cooling and solidifying" includes not only actively cooling and solidifying the resin but also naturally cooling and solidifying the resin.

The method of manufacturing a three-dimensionally formed object according to a seventh aspect of the invention is directed to the method of manufacturing a three-dimensionally formed object according to any one of the first to sixth aspects, in which a material for forming the constituent layer includes at least one selected from the group consisting of magnesium, iron, copper, cobalt, titanium, chromium, nickel, aluminum, maraging steel, stainless steel, cobalt-chromium-molybdenum, a titanium alloy, a nickel alloy, an aluminum alloy, a cobalt alloy, a cobalt-chromium alloy, alumina, and silica.

According to the aspect, a three-dimensionally formed object having particularly high stiffness can be formed.

The method of manufacturing a three-dimensionally formed object according to an eighth aspect of the invention is directed to the method of manufacturing a three-dimensionally formed object according to any one of the first to seventh aspects, in which a material for forming the support layer includes at least one selected from the group consisting of polyvinyl alcohol, polyvinyl pyrrolidone, polyvinyl butyrate, a polyethylene resin, a polypropylene resin, a (meth)acrylic resin, a polycarbonate resin, and paraffin wax.

Polyvinyl alcohol, polyvinyl pyrrolidone, polyvinyl butyrate, a polyethylene resin, a polypropylene resin, a (meth)acrylic resin, a polycarbonate resin, or paraffin wax functions as a binder. Therefore, according to the aspect, the support layer can be prevented from collapsing (deforming) before the solidification of the support layer.

The method of manufacturing a three-dimensionally formed object according to a ninth aspect of the invention is directed to the method of manufacturing a three-dimensionally formed object according to the second aspect, in which, in the heating of the laminate, 90% or higher of the support layer is decomposed and removed.

According to the aspect, in the heating of the laminate, 90% or higher of the support layer is decomposed and removed. Therefore, after the heating of the laminate, the residual support layer can be simply removed from the constituent layer of the three-dimensionally formed object.

BRIEF DESCRIPTION OF THE DRAWINGS

The invention will be described with reference to the accompanying drawings, wherein like numbers reference like elements.

FIG. 1A is a diagram showing a schematic configuration of a three-dimensionally formed object manufacturing apparatus according to an embodiment of the invention, and FIG. 1B is an enlarged view showing a C portion shown in FIG. 1A.

FIG. 2A is a diagram showing a schematic configuration of the three-dimensionally formed object manufacturing apparatus according to the embodiment of the invention, and FIG. 2B is an enlarged view showing a C' portion shown in FIG. 2A.

FIG. 3A is a diagram showing a schematic configuration of the three-dimensionally formed object manufacturing apparatus according to the embodiment of the invention, FIG. 3B is a diagram showing a configuration example of a support layer, and FIG. 3C is a diagram showing an example in which nozzles are disposed in a head.

FIG. 4A is a diagram showing a schematic configuration of a three-dimensionally formed object manufacturing apparatus according to another embodiment of the invention, FIG. 4B is a diagram showing a configuration example of a support layer, and FIG. 4C is a diagram showing an example in which nozzles are disposed in a head.

FIGS. 12A and 12B are diagrams schematically showing the process of manufacturing a three-dimensionally formed object according to the example of the invention.

FIGS. 14A and 14B are diagrams schematically showing the process of manufacturing the three-dimensionally formed object according to the example of the invention.

DESCRIPTION OF EXEMPLARY EMBODIMENTS

Figure 5:
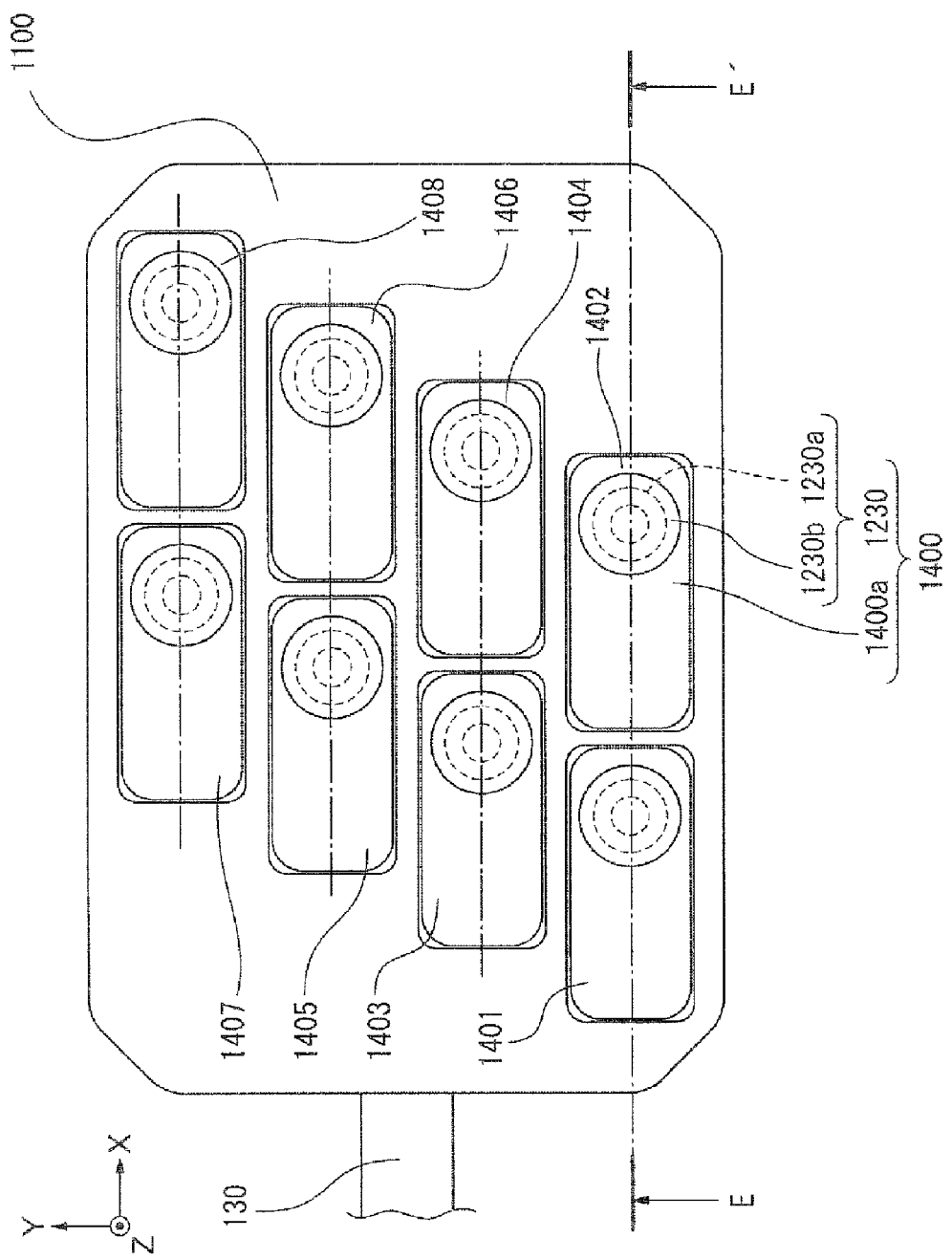
FIG. 5 is a diagram showing the external appearance of a head base according to the embodiment of the invention when seen from a D direction shown in FIG. 1B.

Hereinafter, embodiments of the invention will be described with reference to the drawings.

FIGS. 1A to 2B are diagrams showing a schematic configuration of a three-dimensionally formed object manufacturing apparatus according to an embodiment of the invention.

Here, the three-dimensionally formed object manufacturing apparatus according to the embodiment includes two kinds of material supply portions (head bases). However, in each of FIGS. 1A to 2B, only one of the material supply portions is shown, and the other material supply portion is not shown. In addition, the material supply portion shown in FIGS. 1A and 1B supplies a constituent material (flowable composition) of a three-dimensionally formed object. The material supply portion shown in FIGS. 2A and 2B supplies a support portion-forming material (flowable composition) for forming a support portion which supports the three-dimensionally formed object during the formation of the three-dimensionally formed object. The constituent material according to the example includes metal powder constituting the three-dimensionally formed object, a solvent, and a binder. The support portion-forming material according to the example includes a resin (ultraviolet curable resin) constituting the support layer, a solvent for dissolving the resin therein, and a binder.

"Three-dimensional forming" described in this specification represents forming a so-called three-dimensionally formed object which also includes a planar formed object, that is, a so-called two-dimensionally formed object having a thickness. In addition, the meaning of "support" includes supporting something from below or side and, in some cases, also includes supporting something from above.

A three-dimensionally formed object manufacturing apparatus 2000 (hereinafter, referred to as "forming apparatus 2000") shown in FIGS. 1A to 2B includes: a base 110; a stage 120 that is provided so as to move in X, Y, and Z directions shown in the drawing or to be driven in a rotating direction around a Z axis by a driving device 111 as a driving unit which is included in the base 110. A sample plate 121 can be mounted on the stage 120, and a three-dimensionally formed object 500 can be formed on the sample plate 121.

As shown in FIGS. 1A and 1B, the three-dimensionally formed object manufacturing apparatus 2000 includes a head base support portion 130. The base 110 is fixed to one end portion of the head base support portion 130. A head base 1100 in which plural head units 1400 are held is fixed to the other end portion of the head base support portion 130, in which each of the head units 1400 includes a constituent material ejecting portion that ejects the constituent material.

In addition, as shown in FIGS. 2A and 2B, the three-dimensionally formed object manufacturing apparatus 2000 includes a head base support portion 130'. The base 110 is fixed to one end portion of the head base support portion 130'. A head base 1100' in which plural head units 1600 are held is fixed to the other end portion of the head base support portion 130', in which each of the head units 1600 includes a support portion-forming material ejecting portion (head 1600a) that ejects the support portion-forming material using an ink jet method.

Here, the head base 1100 and the head base 1100' are provided in parallel on an XY plane (refer to FIGS. 3A to 3C).

In the process of forming the three-dimensionally formed object 500, layers 501, 502, and 503 are formed on the stage 120. In FIGS. 1A and 2A, for convenience of description, a three-layer structure including the layers 501, 502, and 503 is adopted. However, layers (in FIGS. 1A and 2A, up to a layer 50n) may be laminated until the three-dimensionally formed object 500 has a desired shape.

Here, each of the layers 501, 502, 503, and 50n includes: a support layer 300 that is formed of the support portion-forming material ejected from the head 1600a as the support portion-forming material ejecting portion; and a constituent layer 310 (corresponding to a constituent region of the three-dimensionally formed object 500) that is formed of the constituent material ejected from the constituent material ejecting portion 1230. Specifically, in the forming apparatus 2000 according to the example, as shown in FIG. 2A, first, the support layer 300 having a predetermined thickness is formed using the head base 1100'. Next, as shown in FIG. 1A, the constituent layer 310 corresponding to the thickness of the support layer 300 is formed using the head base 1100. By laminating the support layer 300 and the constituent layer 310, a laminate of the three-dimensionally formed object 500 is formed. In this way, by forming plural pairs of the constituent layers 310 and the support layers 300, the laminate of the three-dimensionally formed object 500 is completed. A finished product of the three-dimensionally formed object 500 is manufactured by heating the laminate in a thermostatic chamber (heating portion) which is provided separately from the forming apparatus 2000.

Although described below in detail, in the forming apparatus 2000 according to the example, irradiation of ultraviolet rays (energy imparting) using an ultraviolet irradiation unit 1700 is performed during the formation of the support layer 300. This is because the support portion-forming material includes an ultraviolet curable resin. That is, the ultraviolet irradiation unit 1700 functions as a solidification portion of the support layer 300.

However, the support portion-forming material may include, for example, a thermosetting resin instead of the ultraviolet curable resin. In a configuration in which the support portion-forming material is used, a heating portion is provided instead of the ultraviolet irradiation unit 1700 such that irradiation of heat energy (energy imparting) is performed during the formation of the support layer 300. Therefore, in the above-described configuration, in order to protect the three-dimensionally formed object 500 from heat generated from the stage 120, the three-dimensionally formed object 500 may be formed on a sample plate 121 having heat resistance. By using, for example, a ceramic plate as the sample plate 121, high heat resistance can be obtained.

In the forming apparatus 2000 according to the example, the irradiation of the ultraviolet rays is controlled to be started or stopped by an ultraviolet irradiation portion controller 1710 (refer to FIG. 2A) which is connected to a control unit 400.

FIG. 1B is an enlarged view showing a C portion which is the head base 1100 shown in FIG. 1A. As shown in FIG. 1B, the head base 1100 holds the plural head units 1400. Although described below in detail, one head unit 1400 is formed by the constituent material ejecting portion 1230, which is included in a constituent material supply device 1200, being held by a holding jig 1400a. The constituent material ejecting portion 1230 includes: an ejection nozzle 1230a; and an ejection driving portion 1230b that is controlled by a material supply controller 1500 to eject the constituent material through the ejection nozzle 1230a.

FIG. 2B is an enlarged view showing a C portion which is the head base 1100' shown in FIG. 2A. As shown in FIG. 2B, the head base 1100' includes: the head unit 1600 that includes the plural ink jet type heads 1600a; and the ultraviolet irradiation units 1700 that are provided on both sides in the X direction, respectively, and between which the head unit 1600 is provided. The head 1600a includes: ejection nozzles 1600c; and an ejection driving portion 1600b that is controlled by the material supply controller 1500 to eject the support portion-forming material through the ejection nozzles 1600c. The ultraviolet irradiation unit 1700 includes an irradiation portion 1700a that is controlled by the ultraviolet irradiation portion controller 1710 to irradiate ultraviolet rays through an irradiation port 1700b.

The ultraviolet irradiation unit 1700 can efficiently irradiate a supply material as a target with energy, and a high-quality three-dimensionally formed object can be formed. In addition, for example, the intensity of irradiation energy (power, scanning rate) can be easily controlled according to, for example, the kinds of materials to be ejected, and a three-dimensionally formed object having a desired quality can be obtained. However, the invention is not limited to the above-described configuration, and a configuration of imparting energy using another method may be adopted according to the kind of the resin included in the support portion-forming material. A resin which is solidified by natural drying may be used. In a case where this resin is used, it is needless to say that a constituent member (solidification portion) for solidifying the resin is not necessarily provided.

As shown in FIGS. 1A and 1B, the constituent material ejecting portion 1230 is connected to a constituent material supply unit 1210 through a supply tube 1220, the constituent material supply unit 1210 accommodating the constituent material and corresponding to each of the head units 1400 which are held in the head base 1100. A predetermined constituent material is supplied from the constituent material supply unit 1210 to the constituent material ejecting portion 1230. The constituent material supply unit 1210 includes constituent material accommodating portions 1210a, and a supply material including raw materials of the three-dimensionally formed object 500 (a paste-like constituent material including metal powder), which is formed using the forming apparatus 2000 according to the embodiment, is accommodated in the constituent material accommodating portions 1210a. Each of the constituent material accommodating portions 1210a is connected to each of the constituent material ejecting portions 1230 through the supply tube 1220. In this way, by including each of the constituent material accommodating portions 1210a, the constituent material supply unit 1210 can supply different kinds of materials through the head base 1100.

As shown in FIGS. 2A and 2B, each of the heads 1600a is connected to a support portion-forming material supply unit 1210' through a supply tube 1220', the support portion-forming material supply unit 1210' accommodating the support portion-forming material and corresponding to each of the heads 1600a. A predetermined support portion-forming material is supplied from the support portion-forming material supply unit 1210' to the head 1600a. The support portion-forming material supply unit 1210' includes support portion-forming material accommodating portions 1210a', and the support portion-forming material which forms the support portion during the formation of the three-dimensionally formed object 500 (a paste-like support portion-forming material including a resin) is accommodated in the support portion-forming material accommodating portions 1210a' as the supply material. Each of the support portion-forming material accommodating portions 1210a' is connected to each of the heads 1600a through the supply tube 1220'. In this way, by including each of the support portion-forming material accommodating portions 1210a', the support portion-forming material supply unit 1210' can supply different kinds of materials through the head base 1100'.

As the constituent material, for example, a slurry-like (or paste-like) mixed material including a single powder or a mixed powder, a solvent, and a binder can be used, in which examples of the single powder include powders of magnesium (Mg), iron (Fe), cobalt (Co), chromium (Cr), aluminum (Al), titanium (Ti), copper (Cu), and nickel (Ni), and examples of the mixed powder include powders of alloys including one or more of the above-described metals (maraging steel, stainless steel, cobalt-chromium-molybdenum, titanium alloys, nickel alloys, aluminum alloys, cobalt alloys, and cobalt-chromium alloys).

In addition, a general engineering plastic such as polyamide, polyacetal, polycarbonate, modified polyphenylene ether, polybutylene terephthalate, or polyethylene terephthalate can be used. Further, an engineering plastic such as polysulfone, polyether sulfone, polyphenylene sulfide, polyarylate, polyimide, polyamide imide, polyether imide, or polyether ether ketone can be used.

In this way, as the constituent material, for example, a metal other than the above-described metals, a ceramic, or a resin can be used without any particular limitation.

As the support portion-forming material, various resins such as a ultraviolet curable resin or a thermosetting resin can be used, and examples thereof include a (meth)acrylic monomer or oligomer such as (meth)acrylate, urethane acrylate, or polyester acrylate, a polyethylene resin, a polypropylene resin, a (meth)acrylic resin, a polycarbonate resin, and paraffin wax.

Examples of the solvent include: water; (poly)alkylene glycol monoalkyl ethers such as ethylene glycol monomethyl ether, ethylene glycol monoethyl ether, propylene glycol monomethyl ether, or propylene glycol monoethyl ether; acetates such as ethyl acetate, n-propyl acetate, isopropyl acetate, n-butyl acetate, or isobutyl acetate; aromatic hydrocarbons such as benzene, toluene, or xylene; ketones such as methyl ethyl ketone, acetone, methyl isobutyl ketone, ethyl-n-butyl ketone, diisopropyl ketone, or acetyl acetone; alcohols such as ethanol, propanol, or butanol; tetraalkylammonium acetates; sulfoxide solvents such as dimethyl sulfoxide or diethyl sulfoxide; pyridine solvents such as pyridine, γ-picoline, or 2,6-lutidine; and ionic liquids of tetraalkylammonium acetates (for example, tetrabutylammonium acetate). One kind or a combination of two or more kinds selected from the above examples can be used.

Examples of the binder include: synthetic resins such as an acrylic resin, an epoxy resin, a silicone resin, or a cellulose resin; and thermoplastic resins such as polylactic acid (PLA), polyamide (PA), or polyphenylene sulfide (PPS).

The forming apparatus 2000 includes a control unit 400 which controls the stage 120, the constituent material ejecting portions 1230 included in the constituent material supply device 1200, and the heads 1600a and the irradiation portions 1700a included in the support portion-forming material supply device 1200' based on data for forming a three-dimensionally formed object which is output from a data output device (not shown) such as a personal computer. The control unit 400 includes a control portion (not shown) which controls the stage 120 and the constituent material ejecting portion 1230 to be driven and operate in cooperation with each other and controls the stage 120 and the support portion-forming material supply device 1200' to be driven and operate in cooperation with each other.

Regarding the stage 120 which is provided to be movable on the base 110, based on control signals output from the control unit 400, signals for controlling, for example, the moving start and stop, a moving direction, a moving amount, and a moving speed of the stage 120 are generated by a stage controller 410 and are transmitted to the driving device 111 included in the base 110 such that the stage 120 moves in the X, Y, and Z directions shown in the drawings. Regarding the constituent material ejecting portions 1230 included in the head units 1400, based on control signals output from the control unit 400, signals for controlling, for example, the amount of the material ejected through the ejection nozzles 1230a by the ejection driving portions 1230b included in the constituent material ejecting portions 1230 are generated by the material supply controller 1500, and a predetermined amount of the constituent material is ejected through the ejection nozzles 1230a based on the generated signals.

Likewise, regarding the heads 1600a included in the head units 1600, based on control signals output from the control unit 400, signals for controlling, for example, the amount of the material ejected through the ejection nozzles 1600c by the ejection driving portions 1600b included in the heads 1600a are generated by the material supply controller 1500, and a predetermined amount of the support portion-forming material is ejected through the ejection nozzles 1600c based on the generated signals. Regarding the irradiation portions 1700a included in the ultraviolet irradiation units 1700, a control signal is transmitted from the control unit 400 to the ultraviolet irradiation portion controller 1710, and an output signal is transmitted from the ultraviolet irradiation portion controller 1710 to the ultraviolet irradiation units 1700 such that the ultraviolet irradiation units 1700 irradiate ultraviolet rays.

Next, the head base 1100' will be described in more detail using FIGS. 3A to 3C.

FIG. 3A is a diagram showing a schematic configuration of major components of the forming apparatus 2000 according to the example, FIG. 3B is a diagram showing a configuration example of the three-dimensionally formed object 500 in the process of forming, and FIG. 3C is a diagram showing an example in which the nozzles are disposed in the head 1600a. In FIGS. 3B and 3C, lattices are drawn in order to easily understand a relationship between positions of liquid drops ejected from the heads 1600a and positions of the nozzles 1600c, and the lattices of FIG. 3B and the lattices of FIG. 3C correspond to each other. That is, one lattice of FIG. 3B corresponds to one liquid drop of the support portion-forming material ejected through the ejection nozzle 1600c.

The head base 1100' according to the embodiment ejects the support portion-forming material through the ejection nozzles 1600c of the heads 1600a, which are provided in the head units 1600, while moving in the X direction relative to the stage 120 (sample plate 121). As a result, the layers 501, 502, 503, . . . , and 50n can be formed in the process of forming the three-dimensionally formed object 500.

FIG. 3A shows the three-dimensionally formed object 500 in which three layers including the layers 501, 502, and 503 are formed, and FIG. 3B is a plan view showing the three-dimensionally formed object 500.

In addition, in each of the heads 1600a, the ejection nozzles 1600c are formed to be disposed as shown in FIG. 3C. As shown in FIG. 3C, in each of the heads 1600a, four nozzle arrays 1600d are formed along the Y direction by disposing the plural ejection nozzles 1600c. The ejection nozzles 1600c of each of the nozzle arrays 1600d are disposed at intervals of three nozzles. The respective nozzle arrays 1600d are disposed such that the ejection nozzles 1600c thereof are shifted by one nozzle when seen from the X direction. With the above-described configuration, as shown in FIG. 3B, the head base 1100' according to the example can dispose liquid drops of the support portion-forming material with high accuracy.

The head base 1100' according to the example forms a layer having a length in the Y direction corresponding to the nozzle arrays 1600d while moving in the X direction relative to the stage 120. Next, after the position is shifted relative to the stage 120 by the length in the Y direction corresponding to the nozzle arrays 1600d, the head base 1100' further forms a layer having a length in the Y direction corresponding to the nozzle arrays 1600d while moving in the X direction relative to the stage 120. One layer can be formed by repeating the above-described operation, and the layers 501, 502, 503, . . . , and 50n can be sequentially formed by forming the layers as described above.

The head base 1100' according to the example includes the ultraviolet irradiation units 1700 which are provided on both sides of the head unit 1600 in the X direction, respectively. Therefore, after ejecting the support portion-forming material from the ejection nozzles 1600c while moving in the +X direction relative to the stage 120, the head base 1100' can irradiate the support portion-forming material with ultraviolet rays using the ultraviolet irradiation units 1700 which are provided backward in the relative movement direction. In addition, after ejecting the support portion-forming material from the ejection nozzles 1600c while moving in the −X direction relative to the stage 120, the head base 1100' can irradiate the support portion-forming material with ultraviolet rays using the ultraviolet irradiation units 1700 which are provided backward in the relative movement direction. That is, the head base 1100' can form the layers 501, 502, 503, . . . , and 50n while moving in the two directions along the X direction relative to the stage 120. However, the invention is not limited to the above-described configuration.

For example, FIG. 4A shows an example of another configuration of the forming apparatus 2000 which is different from the above-described example.

FIG. 4A is a diagram showing a schematic configuration of major components of the forming apparatus 2000 according to the example, FIG. 4B is a diagram showing a configuration example of the three-dimensionally formed object 500 in the process of forming, and FIG. 4C is a diagram showing an example in which the nozzles are disposed in the head 1600a. That is, FIG. 4A corresponds to FIG. 3A, FIG. 4B corresponds to FIG. 3B, and FIG. 4C corresponds to FIG. 3C. The same components as those of the forming apparatus 2000 shown in FIGS. 3A to 3C are represented by the same reference numerals, the details description will not be repeated.

As shown in FIG. 4A, in the head base 1100' of the forming apparatus 2000 shown in FIGS. 4A to 4C, the ultraviolet irradiation unit 1700 is provided on only one end side (+X direction side) of the head unit 1600 in the X direction. Therefore, after ejecting the support portion-forming material from the ejection nozzles 1600c while moving in the −X direction relative to the stage 120, the head base 1100' can irradiate the support portion-forming material with ultraviolet rays using the ultraviolet irradiation units 1700 which are provided backward in the relative movement direction. On the other hand, after ejecting the support portion-forming material from the ejection nozzles 1600c while moving in the +X direction relative to the stage 120, the head base 1100' cannot irradiate the support portion-forming material with ultraviolet rays using the ultraviolet irradiation units 1700 which are provided backward in the relative movement direction. That is, the head base 1100' can form the layers 501, 502, 503, . . . , and 50n while moving in the −X direction relative to the stage 120. The above-described configuration may be adopted.

Next, the head units 1400 will be described in more detail.

Figure 6:
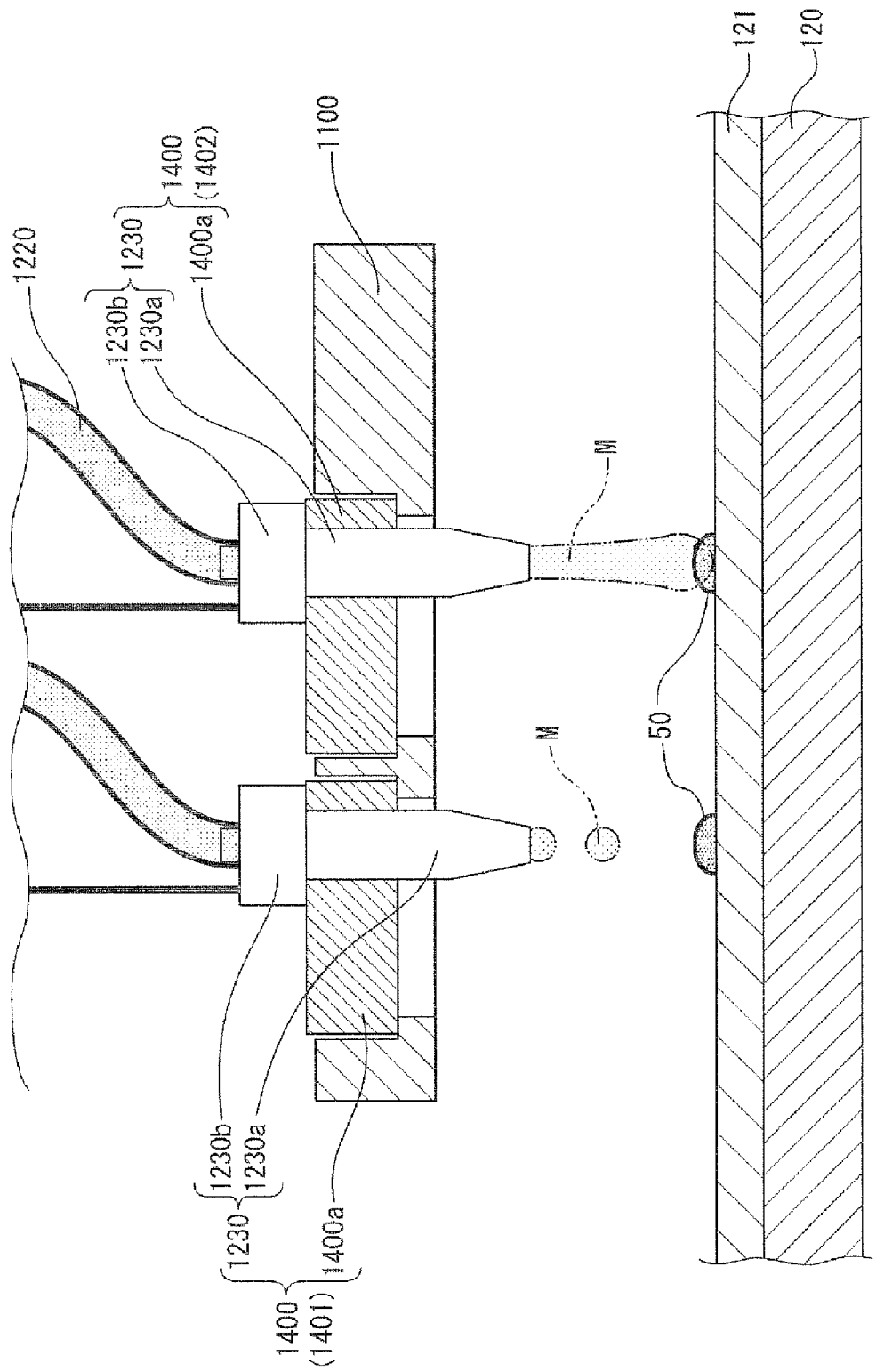
FIG. 6 is a cross-sectional view taken along line E-E' shown in FIG. 5.

FIGS. 5 and 6 show examples of a state where the head units 1400, are held in the head base 1100 and a state where the constituent material ejecting portions 1230 are held in each of the head units 1400. FIG. 5 is a diagram showing the external appearance of the head base 1100 when seen from a direction D shown in FIG. 1B. FIG. 6 is a schematic cross-sectional view taken along line E-E' shown in FIG. 5.

As shown in FIG. 5, in the head base 1100, the plural head units 1400 are held by a fixing unit (not shown). The head base 1100 of the forming apparatus 2000 according to the embodiment includes eight head units 1400 including, from below in the drawing, head units 1401 and 1402 on a first line, head units 1403 and 1404 on a second line, head units 1405 and 1406 on a third line, and head units 1407 and 1408 on a fourth line. Although not shown in the drawing, the constituent material ejecting portions 1230 included in each of the head units 1401 to 1408 are connected to the constituent material supply unit 1210 through the ejection driving portions 1230b and the supply tubes 1220 and are held by the holding jigs 1400a.

As shown in FIG. 6, the constituent material ejecting portions 1230, which are dispensers, eject a material M, which is the constituent material of the three-dimensionally formed object, to the sample plate 121, which is mounted on the stage 120, through the ejection nozzles 1230a. The head unit 1401 ejects the material M, for example, in the form of liquid drops, and the head unit 1402 ejects the material M, for example, in the form of a continuous body. In the forming apparatus 2000 according to the embodiment, the material M is ejected in the form of liquid drops. However, the ejection nozzles 1230a can supply the constituent material in the form of a continuous body. That is, the meaning of the dispenser described in this specification includes both of the configuration capable of supplying the constituent material in the form of a continuous body and the configuration capable of supplying the constituent material in the form of liquid drops.

In the example, the size of liquid drops ejected through the ejection nozzles 1230a is larger than that of liquid drops ejected through the ink jet type ejection nozzles 1600c. Therefore, the constituent material can be filled (corresponding to the formation of the constituent layer) at a higher speed than that at which the support layer (corresponding to the contour region of the three-dimensionally formed object) is formed with high accuracy.

The material M ejected through the ejection nozzles 1230a in the form of liquid drops flies substantially in the gravity direction and lands on the sample plate 121. The landed material M forms landed portions 50. An aggregate of the landed portions 50 is formed as the constituent layer 310 (refer to FIGS. 1A and 1B) of the three-dimensionally formed object 500 formed on the sample plate 121.

Figure 7A:
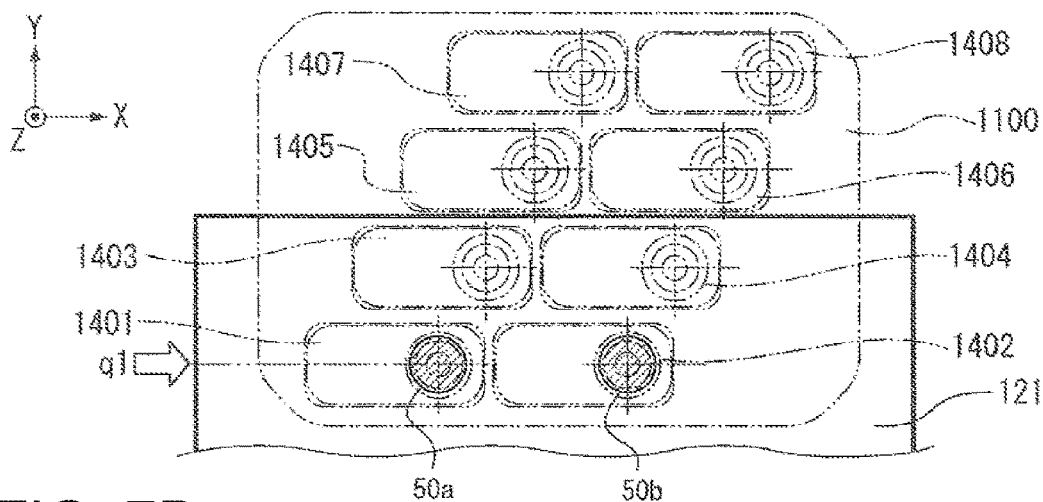
FIGS. 7A to 7C are plan views schematically showing a relationship between a disposition of head units according to the embodiment of the invention and a formed state of landed portions.

FIGS. 7A to 9 are plan views (when seen from the D direction shown in FIGS. 1A and 1B) schematically showing a relationship between a disposition of the head units 1400 and a formed state of the landed portions 50. First, as shown in FIG. 7A, at a forming start point q1 on the sample plate 121, the material M is ejected through the ejection nozzles 1230a of the head units 1401 and 1402 and lands on the sample plate 121 to form landed portions 50a and 50b. For convenience of description, the landed portions 50 are hatched in a plan view, and the constituent layer 310 of the first layer 501 formed on the top surface of the sample plate 121 will be described as an example.

First, as shown in FIG. 7A, at the forming start point q1 of the constituent layer 310 of the layer 501 on the sample plate 121, the material M is ejected through the constituent material ejecting portions 1230 included in the head units 1401 and 1402 on the first line from below in the drawing. The ejected material M forms the landed portions 50a and 50b.

Figure 7B:
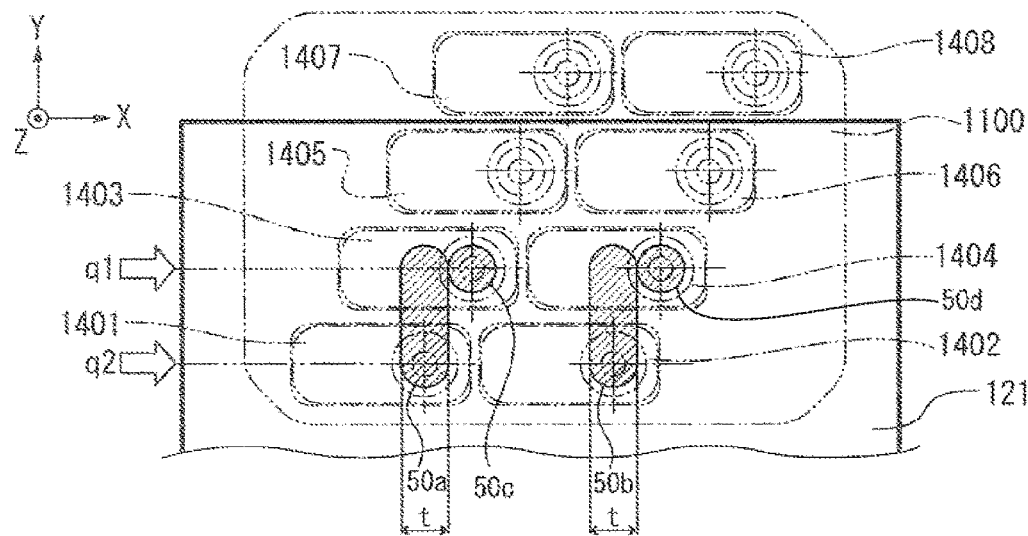

While continuously ejecting the material M through the constituent material ejecting portions 1230 of the head units 1401 and 1402, the sample plate 121 is moved in the Y (+) direction relative to the head base 1100 such that the forming start point q1 shown in FIG. 7B is positioned at a position corresponding to the head units 1403 and 1404 on the second line. As a result, the landed portions 50a and 50b extend from the forming start point q1 to a position q2 after the relative movement of the sample plate 121 while maintaining a width t. Further, the material M is ejected from the head units 1403 and 1404 on the second line corresponding to the forming start point q1 and starts to form landed portions 50c and 50d.

Figure 7C:
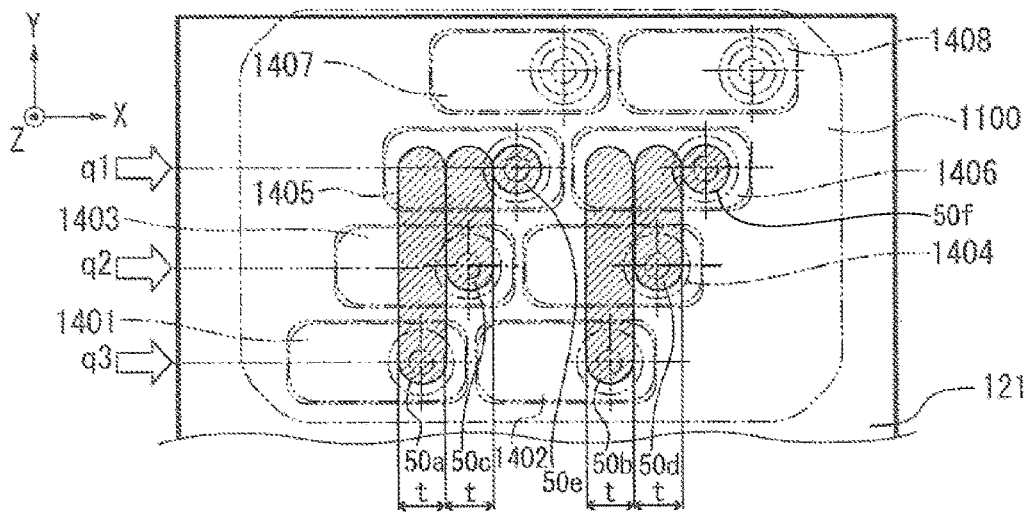

As shown in FIG. 7B, the landed portions 50c and 50d are started to be formed, and while continuously ejecting the material M through the constituent material ejecting portions 1230 of the head units 1403 and 1404, the sample plate 121 is moved in the Y (+) direction relative to the head base 1100 such that the forming start point q1 shown in FIG. 7C is positioned at a position corresponding to the head units 1405 and 1406 on the third line. As a result, the landed portions 50c and 50d extend from the forming start point q1 to the position q2 after the relative movement of the sample plate 121 while maintaining the width t. Concurrently, the landed portions 50a and 50b extend from the forming start point q1 to a position q3 after the relative movement of the sample plate 121 while maintaining the width t. The material M is ejected from the head units 1405 and 1406 on the third line corresponding to the forming start point q1 and starts to form landed portions 50e and 50f.

Figure 8A:
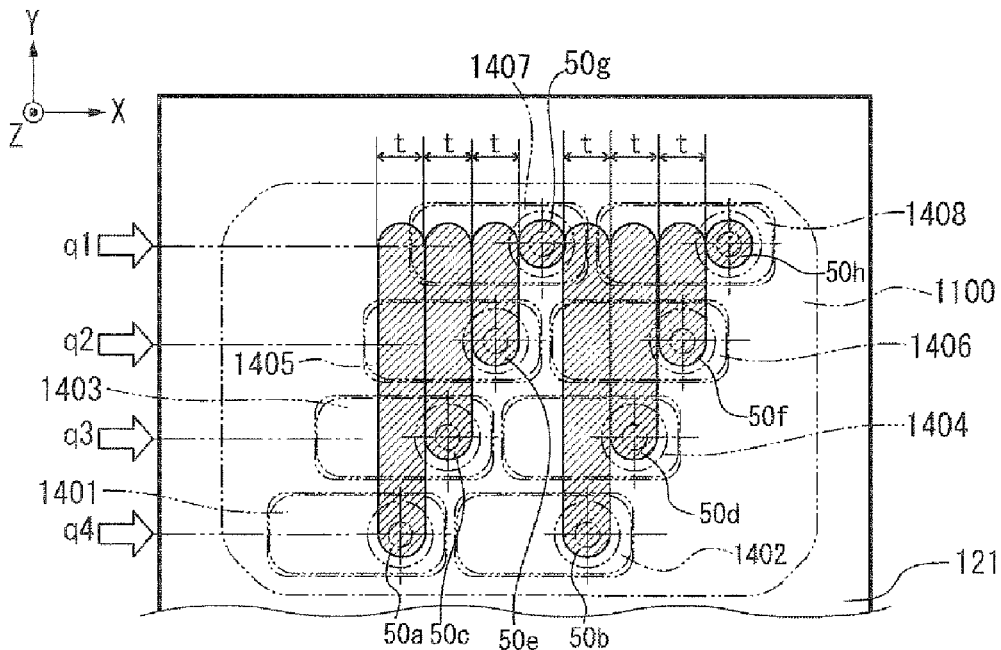
FIGS. 8A and 8B are plan views schematically showing a relationship between a disposition of head units according to the embodiment of the invention and a formed state of landed portions.

As shown in FIG. 7C, the landed portions 50e and 50f are started to be formed, and while continuously ejecting the material M through the constituent material ejecting portions 1230 of the head units 1405 and 1406, the sample plate 121 is moved in the Y (+) direction relative to the head base 1100 such that the forming start point q1 shown in FIG. 8A is positioned at a position corresponding to the head units 1407 and 1408 on the fourth line. As a result, the landed portions 50e and 50f extend from the forming start point q1 to the position q2 after the relative movement of the sample plate 121 while maintaining the width t. Concurrently, the landed portions 50a and 50b extend from the forming start point q1 to a position q4 after the relative movement of the sample plate 121 while maintaining the width t, and the landed portions 50c and 50d extend from the forming start point q1 to the position q3 after the relative movement of the sample plate 121 while maintaining the width t. The material M is ejected from the head units 1407 and 1408 on the fourth line corresponding to the forming start point q1 and starts to form landed portions 50g and 50h.

Figure 8B:
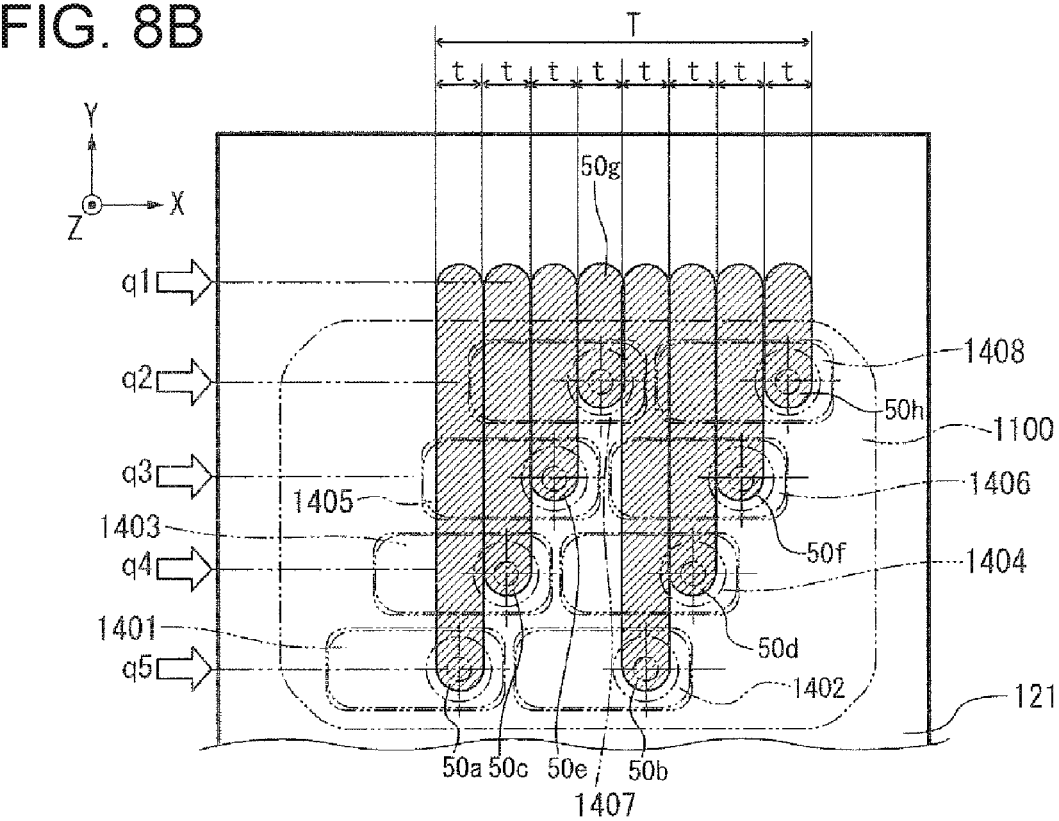
Figure 9:
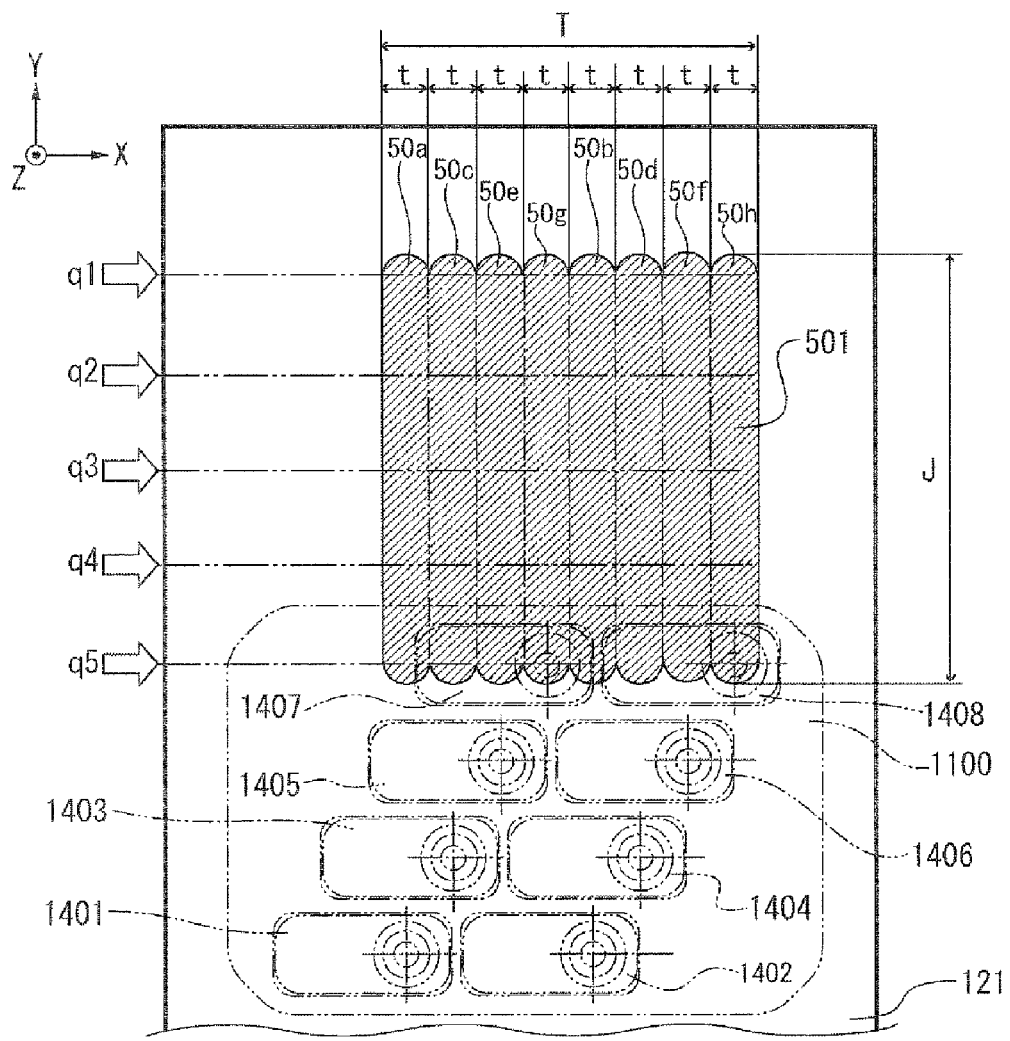
FIG. 9 is a plan view schematically showing a relationship between a disposition of head units according to the embodiment of the invention and a formed state of landed portions.

In a case where a position q5 is set as a forming end point (hereinafter, the position q5 will be referred to as "forming end point q5"), as shown in FIG. 8B, the sample plate 121 is relatively moved until the head units 1401 and 1402 reach the forming end point q5 such that the landed portions 50g and 50h extend. In the head units 1401 and 1402 which have reached the forming end point q5, the ejection of the material M through the constituent material ejecting portions 1230 of the head units 1401 and 1402 is stopped. Further, while relatively moving the sample plate 121 in the Y (+) direction, the material M is ejected through the constituent material ejecting portions 1230 until the head units 1403, 1404, 1405, 1406, 1407, and 1408 reach the forming end point q5. As a result, as shown in FIG. 9, the landed portions 50a, 50b, 50c, 50d, 50e, 50f, 50g, and 50h are formed in the region from the forming start point q1 to the forming endpoint q5 while maintaining the width t. In this way, while moving the sample plate 121 from the forming start point q1 to the forming end point q5, the material M is ejected and supplied from the head units 1401, 1402, 1403, 1404, 1405, 1406, 1407, and 1408 in this order. As a result, in this embodiment, a rectangular aggregate of the landed portions 50 having a width T and a length J can be formed. In this way, the constituent layer 310 of the first layer 501 which is the aggregate of the landed portions 50 can be formed.

As described above, in the forming apparatus 2000 according to the embodiment, in synchronization with the movement of the stage 120 including the sample plate 121, the materials M is selectively ejected and supplied through the constituent material ejecting portions 1230 included in the head units 1401, 1402, 1403, 1404, 1405, 1406, 1407, and 1408. As a result, the constituent layer 310 having a desired shape can be formed on the sample plate 121. In addition, as described above, in this example, by simply moving the stage 120 in a single direction along the Y axis direction, the landed portions 50 having a desired shape can be formed in the region having the width T and the length J shown in FIG. 9, and further the constituent layer 310 which is the aggregate of the landed portions 50 can be formed therein.

In addition, regarding the material M ejected through the constituent material ejecting portions 1230, a constituent material ejected and supplied from one unit or two or more units among the head units 1401, 1402, 1403, 1404, 1405, 1406, 1407, and 1408 may be different from a constituent material ejected and supplied from the other units. Accordingly, by using the forming apparatus 2000 according to the embodiment, a three-dimensionally formed object formed of different materials can be formed.

Figure 10A:
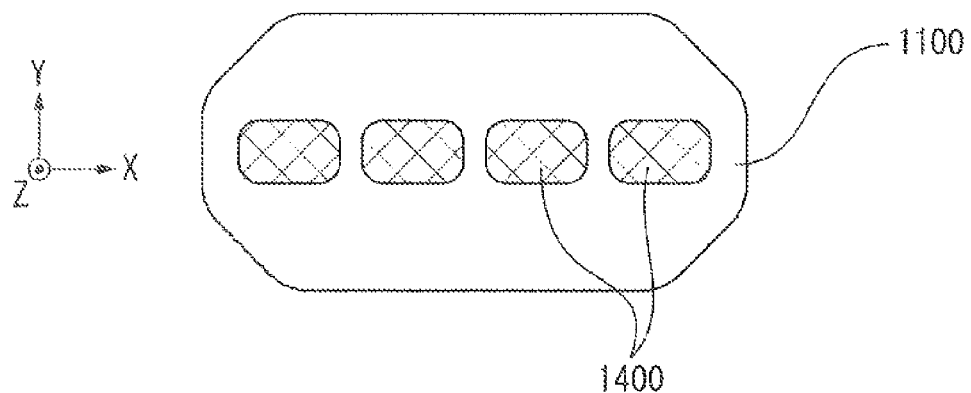
FIGS. 10A and 10B are diagrams schematically showing other disposition examples of head units disposed on the head base.
Figure 10B:
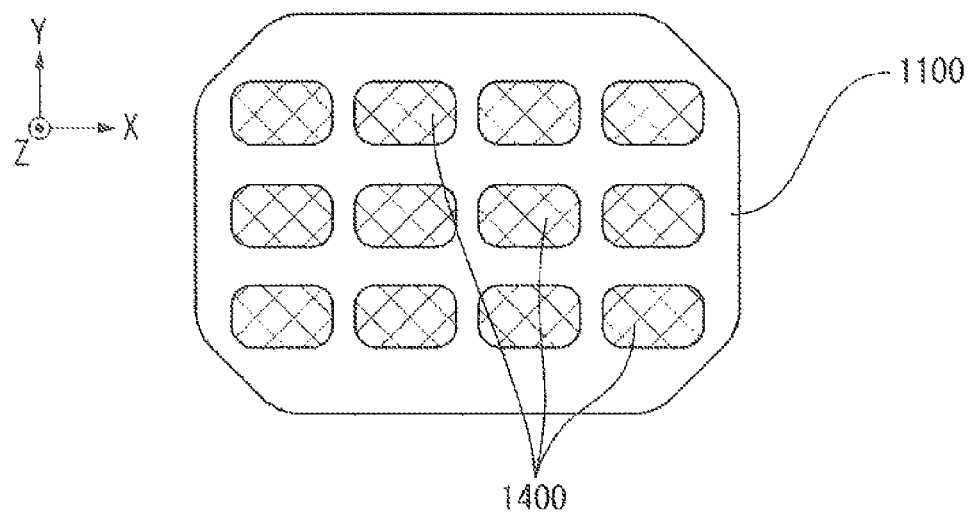

The numbers and dispositions of the head units 1400 and the 1400' included in the forming apparatus 2000 according to the embodiment are not limited to the above-described numbers and dispositions. FIGS. 10A and 10B are diagrams schematically showing other disposition examples of the head units 1400 disposed on the head base 1100.

FIG. 10A shows a state where the plural head units 1400 are provided in parallel in the X axis direction in the head base 1100. FIG. 10B shows a state where the plural head units 1400 are provided in a lattice shape in the head base 1100. The number of head units disposed is not limited to that of each of the examples shown in FIGS. 10A and 10B.

Next, an example in which a method of manufacturing a three-dimensionally formed object is performed using the forming apparatus 2000 according to the embodiment will be described.

FIGS. 11A to 11E are diagrams schematically showing an example of a process of manufacturing a three-dimensionally formed object which is performed using the forming apparatus 2000. In FIGS. 11A to 11E, plural auxiliary lines are drawn in the Z direction such that the thicknesses of the support layer 300 and the constituent layer 310 can be easily recognized.

Figure 11A:
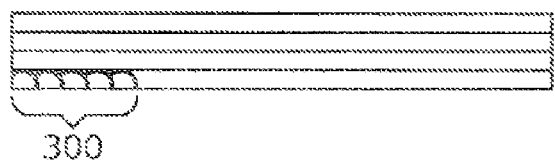
FIGS. 11A to 11E are diagrams schematically showing a process of manufacturing a three-dimensionally formed object according to an example of the invention.

First, as shown in FIG. 11A, a support layer-forming material is ejected from the heads 1600a to form the first support layer 300 having a relatively small thickness. Here, the support layer 300 is formed in regions of the layer excluding a region where the three-dimensionally formed object is formed (a region corresponding to the constituent layer 310). In addition, immediately after ejected from the heads 1600a, the support layer-forming material is irradiated with ultraviolet rays using the ultraviolet irradiation units 1700 which are provided backward in the direction of the relative movement of the head unit 1600 relative to the stage 120. As a result, the support layer 300 is solidified.

Figure 11B:
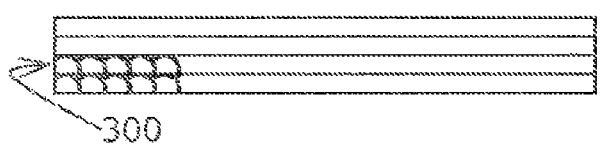

Next, as shown in FIG. 11B, the support layer-forming material is ejected from the heads 1600a and then irradiated with ultraviolet rays using the ultraviolet irradiation units 1700. As a result, the second support layer 300 having a relatively small thickness is formed.

Figure 11C:
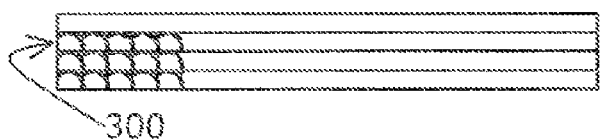

Next, as shown in FIG. 11C, the support layer-forming material is ejected from the heads 1600a and then irradiated with ultraviolet rays using the ultraviolet irradiation units 1700. As a result, the third support layer 300 having a relatively small thickness is formed.

Figure 11D:
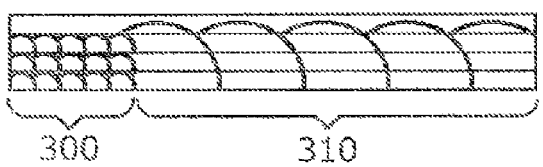

Next, as shown in FIG. 11D, the constituent material is ejected from the constituent material ejecting portions 1230 to form the constituent layer 310 having a relatively large thickness in the region where the three-dimensionally formed object is formed.

As shown in FIG. 11D, before sintering, the thickness of the constituent layer 310, which is formed of the constituent material ejected from the constituent material ejecting portions 1230, is larger than the thickness of the three support layers 300 which is formed of the support layer-forming material ejected from the heads 1600a. Here, in the forming method according to the example, the constituent layer 310 is formed such that the final thickness of the constituent layer 310 is three times the thickness of the support layer 300 in the state shown in FIG. 11D (such that the thickness of a finished product O of the three-dimensionally formed object is three times the thickness of the support layer 300 in the state shown in FIG. 11D).

Figure 11E:
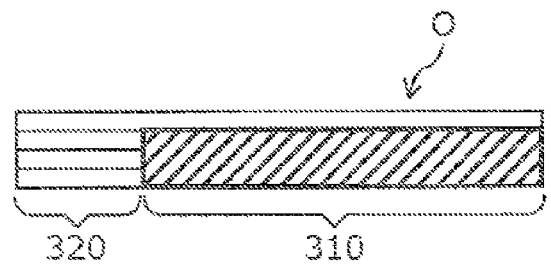

Here, next, as shown in FIG. 11E, the laminate which is formed through the steps shown in FIGS. 11A to 11D is heated in a thermostatic chamber (heating portion) which is provided separately from the forming apparatus 2000 to decompose and remove the support layer 300 and to sinter the constituent layer 310. In the example, the support layer 300 is thermally decomposed and gasified. Therefore, a space portion 320 is formed in the region where the support layer 300 has been decomposed and removed. The thickness of the constituent layer 310 is reduced due to sintering in the heating step. Therefore, after sintering, the constituent layer 310 has a thickness (desired thickness) which is three times the thickness of the support layer 300 before the decomposition and removal.

In this way, a three-dimensionally formed object having a desired shape and a desired size can be manufactured.

Here, FIGS. 12A and 12B show a three-dimensionally formed object having another shape which is manufactured using the same manufacturing process as that of the three-dimensionally formed object shown in FIGS. 11A to 11E. Specifically, a laminate of the three-dimensionally formed object is formed (FIG. 12A) by repeating the steps shown in FIGS. 11A to 11D, and a finished product O of the three-dimensionally formed object is formed (FIG. 12B) by sintering the laminate of the three-dimensionally formed object in the heating step shown in FIG. 11E.

Next, still another example in which a method of manufacturing a three-dimensionally formed object is performed using the forming apparatus 2000 according to the embodiment will be described.

FIGS. 13A to 13E are diagrams schematically showing an example of a process of manufacturing a three-dimensionally formed object which is performed using the forming apparatus 2000. In FIGS. 13A to 13E, plural auxiliary lines are drawn in the Z direction such that the thicknesses of the support layer 300 and the constituent layer 310 can be easily recognized.

Here, the method of manufacturing a three-dimensionally formed object shown in FIGS. 11A to 12B, the thickness of the one constituent layer 310 is larger than the thickness of the one support layer 300. On the other hand, in the method of manufacturing a three-dimensionally formed object shown in FIGS. 13A to 13E, the thickness of the one constituent layer 310 is the same as the thickness of the one support layer 300. However, the viscosity of the constituent material is lower than that of the constituent material used in the method of manufacturing a three-dimensionally formed object shown in FIGS. 11A to 12B. The spreading of liquid drops of the constituent material on a XY plane is wider than the spreading of liquid drops of the constituent material, which is used in the method of manufacturing a three-dimensionally formed object shown in FIGS. 11A to 12B, on a XY plane. As in the case of the method of manufacturing a three-dimensionally formed object shown in FIGS. 11A to 12B, the size of liquid drops of the constituent material is larger than that of liquid drops of the support layer-forming material.

Figure 13A:
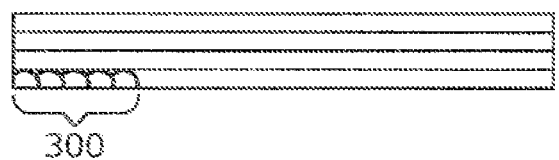
FIGS. 13A to 13E are diagrams schematically showing a process of manufacturing a three-dimensionally formed object according to the example of the invention.

First, as shown in FIG. 13A, the support layer-forming material is ejected from the heads 1600a to form the first support layer 300. Here, the support layer 300 is formed in regions of the layer excluding a region where the three-dimensionally formed object is formed (a region corresponding to the constituent layer 310). In addition, immediately after ejected from the heads 1600a, the support layer-forming material is irradiated with ultraviolet rays using the ultraviolet irradiation units 1700 which are provided backward in the direction of the relative movement of the head unit 1600 relative to the stage 120. As a result, the support layer 300 is solidified.

Figure 13B:

Next, as shown in FIG. 13B, the constituent material is ejected from the constituent material ejecting portions 1230 to form the constituent layer 310 in the region where the three-dimensionally formed object is formed. FIG. 13B shows a state immediate after liquid drops of the constituent material are landed.

Figure 13C:
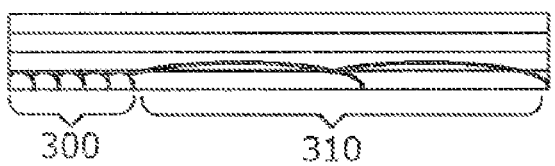

Next, as shown in FIG. 13C, the liquid drops of the constituent material spread in the XY plane direction. However, the size of liquid drops of the constituent material is larger than that of liquid drops of the support layer-forming material. Therefore, the thickness of the constituent layer 310 is larger than the thickness (desired thickness) of the support layer 300.

Figure 13D:
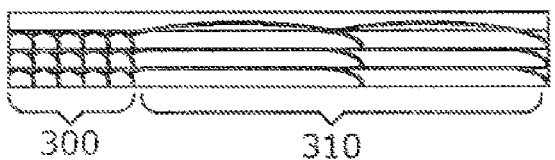

The steps shown in FIGS. 13A to 13C are repeated. FIG. 13D shows a state where a laminate of the three-dimensionally formed object is formed by repeating the steps shown in FIGS. 13A to 13C.

Figure 13E:
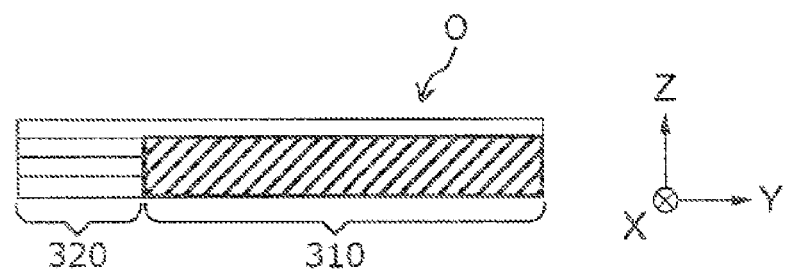

Here, next, as shown in FIG. 13E, the laminate shown in FIG. 13D is heated in a thermostatic chamber (heating portion) which is provided separately from the forming apparatus 2000 to decompose and remove the support layer 300 and to sinter the constituent layer 310. In the example, the support layer 300 is thermally decomposed and gasified. Therefore, a space portion 320 is formed in the region where the support layer 300 has been decomposed and removed. The thickness of the constituent layer 310 is reduced due to sintering in the heating step. Therefore, after sintering, the constituent layer 310 has a desired thickness.

In this way, a three-dimensionally formed object having a desired shape and a desired size can be manufactured.

Here, FIGS. 14A and 14B show a three-dimensionally formed object having another shape which is manufactured using the same manufacturing process as that of the three-dimensionally formed object shown in FIGS. 13A to 13E. Specifically, a laminate of the three-dimensionally formed object is formed (FIG. 14A) by repeating the steps shown in FIGS. 13A to 13D, and a finished product O of the three-dimensionally formed object is formed (FIG. 14B) by sintering the laminate of the three-dimensionally formed object in the heating step shown in FIG. 13E.

Next, an example of the method of manufacturing a three-dimensionally formed object using the forming apparatus 2000 (an example corresponding to FIGS. 11A to 12B) will be described using a flowchart.

Figure 15:
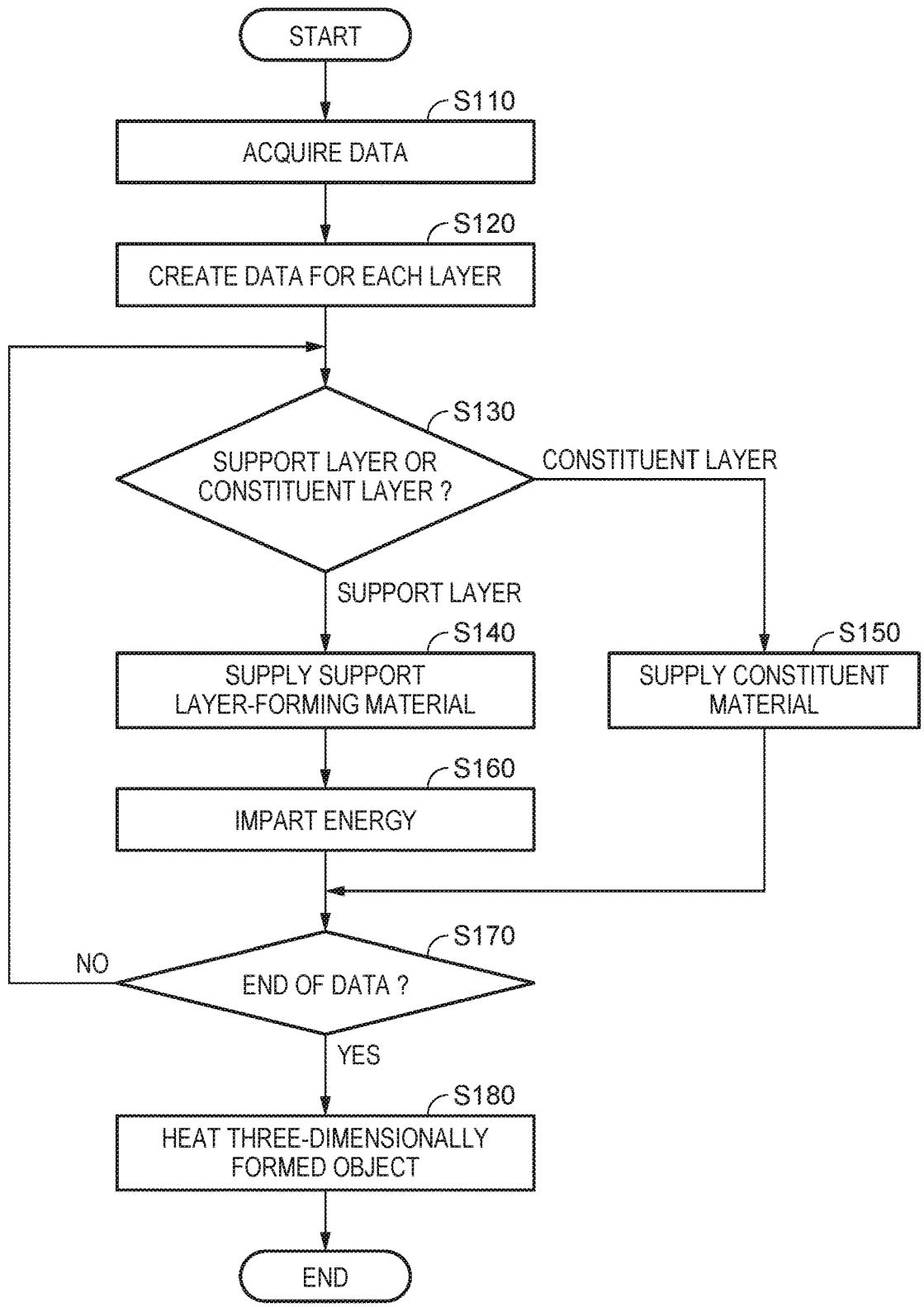
FIG. 15 is a flowchart showing a method of manufacturing a three-dimensionally formed object according to an example of the invention.

Here, FIG. 15 is the flowchart showing the method of manufacturing a three-dimensionally formed object according to the example.

This example is the example of the method of manufacturing a three-dimensionally formed object corresponding to FIGS. 11A to 12B. However, the method of manufacturing a three-dimensionally formed object corresponding to FIGS. 13A to 14B can also be adopted.

As shown in FIG. 15, in the method of manufacturing a three-dimensionally formed object according to the example, firstly, data of a three-dimensionally formed object is acquired in Step S110. Specifically, for example, data representing the shape of the three-dimensionally formed object is acquired from, for example, an application program which is performed by a personal computer.

Next, in Step S120, data for each layer is created. Specifically, in the data representing the shape of the three-dimensionally formed object, bitmap data (cross-sectional data) is generated for each of cross-sections which are obtained by slicing the three-dimensionally formed object according to a forming resolution in the Z direction.

At this time, in the generated bitmap data, a region where the three-dimensionally formed object is formed is distinguished from regions where the three-dimensionally formed object is not formed. In other words, in the data, the regions which are formed of liquid drops (small dot) having a small dot diameter ejected from the heads 1600a and the region which is formed of liquid drops (large dot) having a large dot diameter ejected from the constituent material ejecting portions 1230 are distinguished from each other for each layer.

A difference between the large dot diameter and the small dot diameter is not particularly limited. By setting the large dot diameter to be eight times or more of the small dot diameter, a three-dimensionally formed object can be rapidly and effectively manufactured with high accuracy.

Next, in Step S130, the data of the layer to be formed is determined whether to be data for forming the regions (support layer 300) where the three-dimensionally formed object is not formed or data for forming the region (constituent layer 310) where the three-dimensionally formed object is formed. This determination is performed by the control portion included in the control unit 400.

In this step, in a case where it is determined that the data of the layer is the data for forming the support layer 300, the process proceeds to Step S140, and in a case where it is determined that the data of the layer is the data for forming the constituent layer 310, the process proceeds to Step S150.

In Step S140, the support layer-forming material is ejected from the heads 1600a based on the data for forming the support layer 300. As a result, small dots of the support layer-forming material can be supplied.

After the support layer-forming material is ejected in Step S140, the ejected liquid drops (support layer 300) are solidified by being irradiated with ultraviolet rays (energy imparting) using the ultraviolet irradiation units 1700 which are provided backward in the direction of the relative movement of the head unit 1600 relative to the stage 120 in Step S160.

On the other hand, in Step S150, large dots of the constituent material are supplied by ejecting the constituent material from the constituent material ejecting portions 1230.

In Step S170, whether or not the formation of the three-dimensionally formed object is finished is determined based on the bitmap data corresponding to each of the layers which is generated in Step S120, and Steps S130 to S170 are repeated until the formation of the laminate of the three-dimensionally formed object is finished.

In Step S180, the laminate of the three-dimensionally formed object which is formed in the above-described steps is heated in a thermostatic chamber (not show). Specifically, the region (constituent layer 310) where the three-dimensionally formed object is formed is sintered, and the support layer 300 around the constituent layer 310 is decomposed and removed.

After the completion of Step S180, the method of manufacturing a three-dimensionally formed object according to the example ends.

As described above, in the method of manufacturing a three-dimensionally formed object according to any one of the examples, the three-dimensionally formed object is manufactured by laminating layers to form a laminate. This methods includes: a constituent layer forming step (corresponding to Step S150) of forming the constituent layer 310 corresponding to a constituent region of the three-dimensionally formed object; a support layer forming step (corresponding to Step S140) of forming the support layer 300 which is in contact with the constituent layer 310 and supports the constituent layer 310 by ejecting a flowable composition including a resin from the heads 1600a in the form of liquid drops; a solidification step (corresponding to Step S160) of solidifying the support layer 300; and a heating step (corresponding to Step S180) of heating the laminate which is formed in the constituent layer forming step, the support layer forming step, and the solidification step.

As described above, the method of manufacturing a three-dimensionally formed object according to any one of the examples includes: the constituent layer forming step of forming the constituent layer 310; and the support layer forming step of forming the support layer 300 by ejecting a flowable composition including a resin from an ejecting portion (heads 1600a) in the form of liquid drops. For example, by using the flowable composition in which the resin is dissolved or is dispersed in the form of fine particles, the support layer 300 which determines the contour shape of the three-dimensionally formed object can be formed with high accuracy. In other words, the presence of the solid component (particles) having a large particle size can prevent the unevenness of the surface shape. By rapidly forming the constituent layer 310 constituting the inside of the three-dimensionally formed object which is not necessarily to be formed with high accuracy, the three-dimensionally formed object can be rapidly manufactured with high accuracy.

Here, "contour" is a portion which forms the surface shape of the three-dimensionally formed object. For example, in a case where a coating layer is provided on the surface of the three-dimensionally formed object, "contour" may refer to a layer below the coating layer.

In addition, in the heating step of the method of manufacturing a three-dimensionally formed object according to any one of the examples, as shown in FIGS. 11A to 14B, the support layer 300 is decomposed and removed, and the constituent layer 310 is sintered. That is, in the heating step, the laminate is collectively sintered. Therefore, the support layer can prevent the shape of constituent layer from collapsing until it is decomposed and removed in the heating step after the formation of the laminate, and can form the three-dimensionally formed object with particularly high accuracy. In addition, as compared to a case where each layer is sintered, the accumulation of strains caused by sintering can be reduced, and a three-dimensionally formed object can be formed with higher accuracy.

However, the constituent layer 310 can be melted instead of being sintered.

In addition, in the constituent layer forming step of the method of manufacturing a three-dimensionally formed object according to any one of the examples, the constituent layer 310 is formed by ejecting the flowable composition from the ejecting portion (constituent material ejecting portions 1230) in the form of liquid drops. As shown in FIGS. 11A to 14B, the size of (at least a portion of) liquid drops for forming the support layer 300 in the support layer forming step is smaller than the size of (at least a portion of) liquid drops for forming the constituent layer 310 in the constituent layer forming step. That is, the support layer 300 can be formed using the liquid drops having a smaller size than the liquid drops for forming the constituent layer 310. That is, the support layer 300 which determines the contour shape of the three-dimensionally formed object is formed using the relatively small liquid drops, and the constituent layer 310 constituting the inside of the three-dimensionally formed object is formed using the relatively large liquid drops. Therefore, the support layer 300 determining the contour shape of the three-dimensionally formed object, which is necessarily formed with high accuracy, can be formed with high accuracy, and the constituent layer 310 constituting the inside of the three-dimensionally formed object, which is not necessarily formed with high accuracy, can be rapidly formed. Accordingly, the three-dimensionally formed object can be rapidly manufactured with high accuracy. Further, since the constituent layer 310 is formed of the relatively large liquid drops, particles having a large particle size can be used as the constituent material, the material selectivity can also be improved.

In addition, the resin included in the support layer-forming material which is used in the forming apparatus 2000 according to any one of the examples is an ultraviolet curable resin, and the support layer 300 is irradiated with ultraviolet rays in the solidification step. Therefore, the support layer 300 can be simply formed with high accuracy. However, the invention is not limited to the above-described configuration. In a case where the resin included in the support layer-forming material is an ultraviolet curable resin, it is preferable that the support layer-forming material further includes a polymerization initiator.

For example, a thermosetting resin such as a phenol resin, a urea resin, a melamine resin, an epoxy resin, unsaturated polyester, a silicone resin, or polyurethane, or a monomer or oligomer such as (meth)acrylate to which a thermal polymerization initiator is added may be used as the resin included in the support layer-forming material, and the support layer 300 may be heated in the solidification step. Even in the above-described method of manufacturing a three-dimensionally formed object, the support layer 300 can be simply formed with high accuracy.

In addition, for example, a solid resin may be melted and the molten resin may be ejected from the ejecting portion in the form of liquid drops to form the support layer 300 in the support layer forming step, and the molten resin may be cooled and solidified in the solidification step. Even in the above-described method of manufacturing a three-dimensionally formed object, the support layer 300 can be simply formed with high accuracy.

The meaning of "cooling and solidifying" includes not only actively cooling and solidifying the resin but also naturally cooling and solidifying the resin.

In addition, it is preferable that the material for forming the constituent layer 310 includes at least one selected from the group consisting of magnesium, iron, copper, cobalt, titanium, chromium, nickel, aluminum, maraging steel, stainless steel, cobalt-chromium-molybdenum, a titanium alloy, a nickel alloy, an aluminum alloy, a cobalt alloy, a cobalt-chromium alloy, alumina, and silica. This is because a three-dimensionally formed object having particularly high stiffness can be formed.

In addition, the material for forming the support layer 300 may include at least one selected from the group consisting of polyvinyl alcohol, polyvinyl pyrrolidone, and polyvinyl butyrate. Polyvinyl alcohol, polyvinyl pyrrolidone, or polyvinyl butyrate functions as a binder. Therefore, by including polyvinyl alcohol, polyvinyl pyrrolidone, or polyvinyl butyrate, the support layer 300 can be prevented from collapsing (deforming) before the solidification step of solidifying the support layer 300.

In addition, it is preferable that, in the heating step, 90% or higher of the support layer is decomposed and removed. This is because, after the heating step, the remaining support layer 300 can be simply removed from the constituent layer 310 of the three-dimensionally formed object (the finished product O of the three-dimensionally formed object can be simply cleaned).

The invention is not limited to the above-described examples and can be realized in various embodiments within a range not departing from the scope of the invention. For example, the technical features of any one of the examples corresponding to the technical features of any one of the embodiments described in "Summary" can be appropriately replaced or combined in order to solve a part or all of the above-described problems or to achieve a part or all of the above-described effects. In addition, the technical features may be appropriately omitted unless they are described as essential features in this specification.

The entire disclosure of Japanese patent No. 2015-222156, filed Nov. 12, 2015 is expressly incorporated by reference herein.

What is claimed is:

1. A method of manufacturing a three-dimensionally formed object in which the three-dimensionally formed object is manufactured by laminating layers to form a laminate, the method comprising:
    forming a support layer by ejecting a flowable composition including a resin from an ejecting portion in the form of liquid drops having a first size, the ejection portion having a plurality of support material nozzles arranged in a plurality of nozzle arrays;
    solidifying the support layer;
    forming a constituent layer corresponding to a constituent region of the three-dimensionally formed object by ejecting a flowable composition in a form of liquid drops having a second size always larger than the first size, a constituent layer ejection portion having a constituent material ejection nozzle array of a plurality of constituent material nozzles that are fewer than the plurality of support material nozzles, each constituent material nozzle being supported by an individual holding jig that also supports an ejection driving portion that controls ejection of the constituent material, each holding jig being individually disposed within a head base and is elongate in a direction transverse to a direction in which each nozzle array ejects the constituent material, the constituent layer being in contact with and supported by the support layer, the liquid drops for forming the constituent layer having a thickness in the ejection direction, at a state immediately after the liquid drops have landed, that is at least three times a thickness of the droplet for forming the support layer;
    heating the laminate which is formed in the formation of the constituent layer, the formation of the support layer, and the solidification of the support layer.

2. The method of manufacturing a three-dimensionally formed object according to claim 1,
    wherein in the heating of the laminate, the support layer is decomposed and removed and the constituent layer is sintered.

3. The method of manufacturing a three-dimensionally formed object according to claim 2,
    wherein in the heating of the laminate, 90% or higher of the support layer is decomposed and removed.

4. The method of manufacturing a three-dimensionally formed object according to claim 1,
    wherein the resin is an ultraviolet curable resin, and
    in the solidification of the support layer, the support layer is irradiated with ultraviolet rays.

5. The method of manufacturing a three-dimensionally formed object according to claim 1,
    wherein the resin is a thermosetting resin, and
    in the solidification of the support layer, the support layer is heated.

6. The method of manufacturing a three-dimensionally formed object according to claim 1,
    wherein in the formation of the support layer, the resin, which is solid, is melted and the molten resin is ejected from the ejecting portion in the form of liquid drops to form the support layer, and
    in the solidification of the support layer, the molten resin is cooled and solidified.

7. The method of manufacturing a three-dimensionally formed object according to claim 1, wherein a material for forming the constituent layer includes at least one selected from a group consisting of magnesium, iron, copper, cobalt, titanium, chromium, nickel, aluminum, maraging steel, stainless steel, cobalt-chromium-molybdenum, a titanium alloy, a nickel alloy, an aluminum alloy, a cobalt alloy, a cobalt-chromium alloy, alumina, and silica.

8. The method of manufacturing a three-dimensionally formed object according to claim 1,
wherein a material for forming the support layer includes at least one selected from a group consisting of polyvinyl alcohol, polyvinyl pyrrolidone, polyvinyl butyrate, a polyethylene resin, a polypropylene resin, a (meth)acrylic resin, a polycarbonate resin, and paraffin wax.

9. The method of manufacturing a three-dimensionally formed object according to claim 1, wherein solidifying the support layer comprises solidifying the support layer during formation of the support layer by irradiating the flowable composition,
wherein an irradiation unit is mounted to a head base supporting the ejecting portion and is movable with the ejection portion.

\* \* \* \* \*